United States Patent
Allen et al.

(10) Patent No.: US 6,907,961 B2
(45) Date of Patent: Jun. 21, 2005

(54) APPARATUS AND METHOD FOR RETARDING TRANSLATION BETWEEN TWO BODIES

(75) Inventors: Timothy J. Allen, Houston, TX (US); David H. Theiss, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 35 days.

(21) Appl. No.: 10/166,879

(22) Filed: Jun. 11, 2002

(65) Prior Publication Data

US 2003/0226725 A1 Dec. 11, 2003

(51) Int. Cl.⁷ .......................... B65H 59/10; F16H 3/06; F16B 37/12; F16B 21/18
(52) U.S. Cl. ................... 188/67; 74/89.39; 411/438; 411/530
(58) Field of Search .................... 74/89.39, 411.5; 411/438, 516, 517, 530; 188/67–69, 77 W, 77 R, 78, 79.51, 82.9, 84, 265, 196 R

(56) References Cited

U.S. PATENT DOCUMENTS

| | | | | |
|---|---|---|---|---|
| 439,457 A | * | 10/1890 | Whittemore et al. | 24/705 |
| 3,589,423 A | * | 6/1971 | Metz | 411/262 |
| 4,292,715 A | * | 10/1981 | Huddon | 24/705 |
| 4,411,339 A | | 10/1983 | Porter | 188/67 |
| 4,457,406 A | | 7/1984 | Porter | 188/67 |
| 5,046,376 A | | 9/1991 | Baker | 74/424.8 VA |
| 5,150,771 A | | 9/1992 | Porter | 188/67 |
| 5,261,446 A | | 11/1993 | Baker | 137/458 |
| 5,441,129 A | | 8/1995 | Porter et al. | 188/67 |
| 5,568,843 A | | 10/1996 | Porter et al. | 188/67 |
| 5,724,858 A | | 3/1998 | Polando | 74/502.6 |
| 6,652,209 B2 | * | 11/2003 | Hoffmann | 411/438 |

OTHER PUBLICATIONS

Printout from Internet site of York Industries, Inc., including company home page and two pages with information about the company's Bear–Loc © product; total 3 pages; no date of publication.

* cited by examiner

*Primary Examiner*—Xuan Lan Nguyen
(74) *Attorney, Agent, or Firm*—Jackie Lee Duke; Michael P. Hartmann; Peter Bielinski

(57) ABSTRACT

A rod brake, and a method, including an elastic device, such as a coil spring, array of split rings, or an elastic sleeve, that engages one or more grooves in a cylindrical surface to restrain the rod from longitudinal movement relative to another body, and wherein longitudinal force is applied to distort the elastic device and push it out of the one or more grooves to release the rod for longitudinal movement is disclosed. A locking sleeve is added to lock the elastic device against distortion and movement to the release configuration.

5 Claims, 24 Drawing Sheets

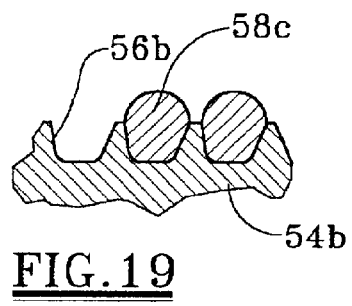
FIG.18
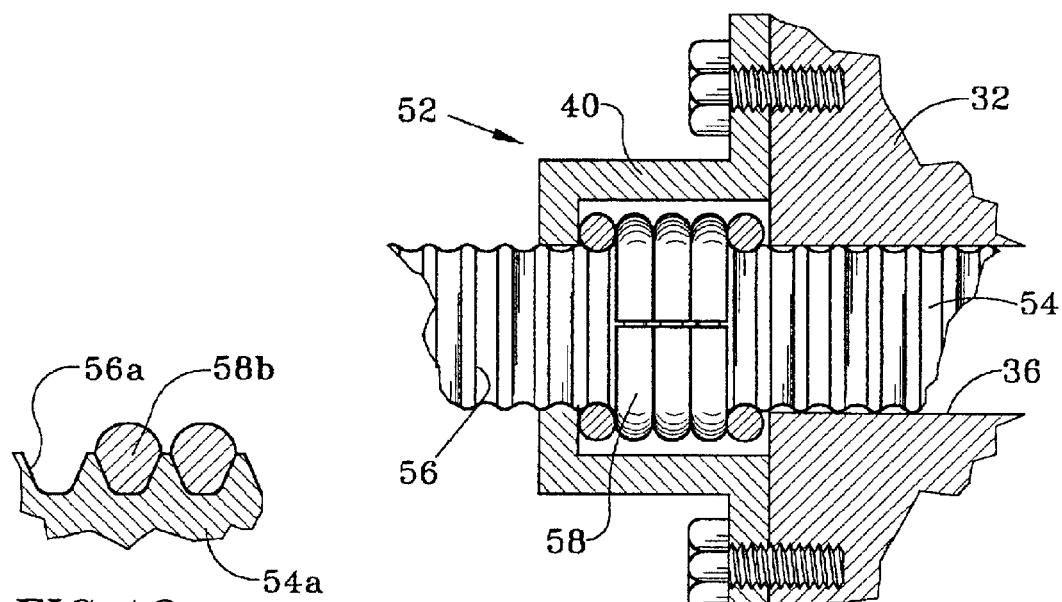
FIG.12
FIG.19
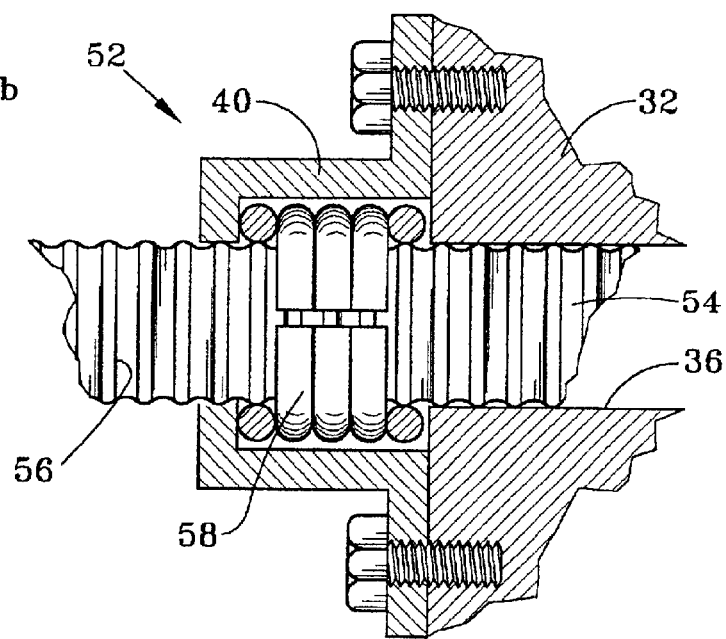
FIG.13

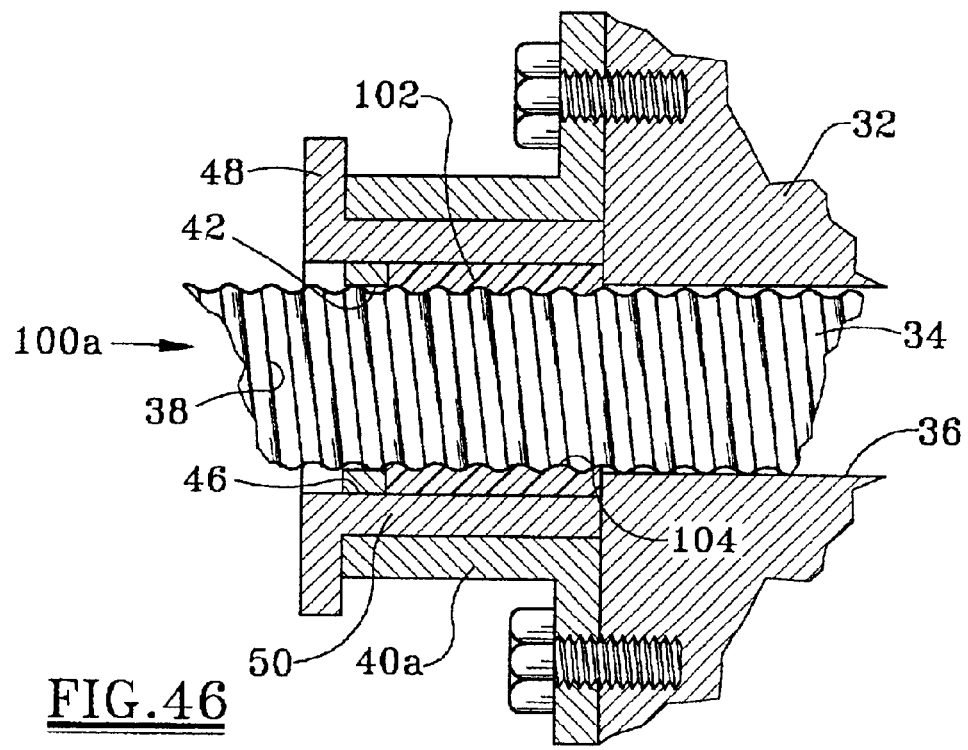
FIG.46
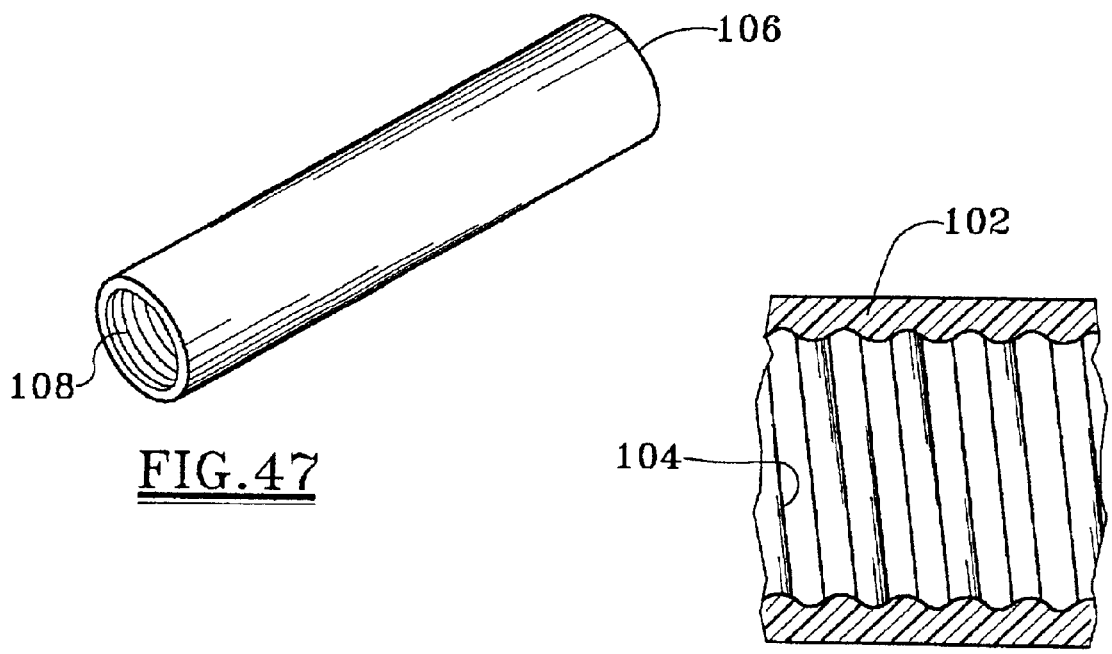
FIG.47
FIG.44

APPARATUS AND METHOD FOR RETARDING TRANSLATION BETWEEN TWO BODIES

TECHNICAL FIELD

The invention relates to apparatus and methods for preventing or limiting relative linear movement between two bodies or objects. More particularly, the present invention pertains to the construction and operation of brakes and locks for retarding the translation of an object.

BACKGROUND OF THE INVENTION

Locking devices are needed in various settings to prevent, and selectively allow, longitudinal translation of an object, such as a rod, relative to another body. Cooper Cameron Corporation provides a mechanical device on a subsea collet connector that is used to secure a blowout preventer stack to a wellhead to prevent the inadvertent unlocking of the collet connector. The Cooper Cameron Corporation lock is shown generally at 10 in FIG. 1. A pair of opposed jaws 12 and 14 provide an opening within which a rod (not shown) is located. The jaws 12 and 14 are fixed to a frame 16 with shoulder screws that restrict axial movement but allow limited lateral movement of the jaws relative to the frame. The frame 16 is appropriately mounted on the collet connector. A bracket 18 receives two guide bolts 20 in appropriate holes. The guide bolts 20 also pass through appropriate holes in the jaws 12 and 14. The jaws 12 and 14 are movable along the guide bolts 20 within the restrictions of the shoulder screws used to mount the jaws on the frame 16. Nuts at the ends of the guide bolts 20 keep the guide bolts confined within the holes in the bracket 18 and the jaws 12 and 14. Spring washers 22 are positioned along the guide bolts 20 between the bracket 18 and the jaw 12, urging the jaw 12 toward the jaw 14. Thus, the spring washers 22 tend to force the two jaws 12 and 14 together around the rod that passes between them. The surface of each of the two jaws 12 and 14 that contacts the rod is curved, and lined with grooves and teeth 24. The teeth 24 engage the rod by being received within like grooves defining teeth on the rod, to hold the rod against longitudinal movement relative to the frame 16. Only by application of sufficient longitudinal force on the rod can the teeth and grooves of the rod and the jaws 12 and 14 interact to force the jaw 12 to be pushed against the spring washers 22, moving away from the jaw 14 and allowing the teeth of the rod and jaws to disengage to allow the rod to move. Friction and mechanical spring forces thus provide the resistance to hold the rod against movement relative to the frame.

A pin 26 is threaded through a hole in the bracket 18 and can be advanced to engage the jaw 12 and so limit the movement of the jaw 12 and the bracket toward each other, while the guide bolts 20 limit movement of the jaw 14 away from the bracket. The pin 26 can thus lock the jaws 12 and 14 against movement away from each other with a rod engaged by the jaw teeth 24, and so lock the rod against longitudinal movement relative to the frame 16.

The mechanical lock 10 can be too large for some applications. Further, the bolts 20 and the spring washers 22 have a tendency to corrode in the subsea environment. Spring washers require exotic materials in order to fit a properly designed washer inside limited space and generate the forces required. This makes the spring washers expensive.

Another locking device provided by Cooper Cameron Corporation employs a housing containing a stack of flat washers that fit loosely around a rod that extends along a passage through the housing. A coil spring pushes longitudinally on one side of the stack of washers to tilt all of the washers relative to the rod. The slanted washers thus engage and bind the rod by friction against longitudinal movement through the housing. A pin is provided whereby force may be applied to push the washers against the spring to lower the tilt of the washers and release the rod for longitudinal movement relative to the washers and the housing.

Another type of locking device is that sold under the registered trademark BEAR-LOC®. This lock includes a metal sleeve, and is based on the principle of elastic expansion of metal under pressure. The sleeve surrounds a rod and grabs the rod with a consistent amount of force, and is released when hydraulic pressure is applied to the device. Aside from the tendency of this style of lock to be expensive, the sleeve must be long to provide enough surface area to generate the friction required for significant resistance. Further, since the device works off of friction between the sleeve and a polished rod, there is a tendency for the resistance to decrease with number of cycles as the sleeve wears.

It is advantageous and desirable to provide an improved locking, or braking, device for retarding translation of a rod, for example, relative to another body. It is an object of the present invention to provide such a device that can be made in a wide range of sizes, and that requires no highly technical equipment to operate. The present invention meets these needs.

SUMMARY OF THE INVENTION

The present invention provides apparatus for retarding translation of one body relative to another body wherein a first body circumscribes a second body. A cylindrical surface is part of one of the first and second bodies, and circumscribes the second body. The cylindrical surface is structured with one or more grooves. Where one groove is used, the groove is in the form of a helical thread that runs along the cylindrical surface. Where more than one groove is used, the grooves are circular, passing around the cylindrical surface. A retainer is carried by the other of the first and second bodies that does not have the structured cylindrical surface. The retainer may be integral with the body that carries it, or may be attached thereto. A first round elastic device is confined by the retainer and thereby restrained against longitudinal movement relative to the retainer. The first elastic device is in the form of a coil spring, an array of split rings, or an elastic sleeve. The elastic device is round in the sense that it is generally circular, or cylindrical, although in the form of an array of rings it is split, and in sleeve form it may also be split longitudinally. The first elastic device is constrained by its elasticity toward the one or more grooves of the cylindrical surface, and resides in the one or more grooves if not forced out of the groove or grooves. The first elastic device is movable between a restrain configuration in which the elastic device resides in the one or more grooves of the cylindrical surface to prevent relative translation between the first and second bodies, and a release configuration in which the elastic device is distorted and pushed out of the one or more grooves of the cylindrical surface to allow relative translation between the first and second bodies. Longitudinal force is applied to so push the first elastic device out of the groove or grooves.

In one form of the invention the cylindrical surface is part of the second body and the retainer is carried by the first body. In such form of the invention, the elastic device is distorted and removed from the one or more grooves by radial expansion of the elastic device.

In another form of the invention, the cylindrical surface is part of the first body and the retainer is carried by the second body. In this form of the invention, the elastic device is distorted and removed from the one or more grooves by radial contraction of the elastic device.

A second round elastic device may be included, constrained by its elasticity toward the one or more grooves of the cylindrical surface, and confined by the retainer and thereby restrained against longitudinal movement relative to the retainer. In such case, one of the first and second elastic devices is inside the other elastic device so that the first elastic device is between the cylindrical surface and the second elastic device.

A locking sleeve may be included, receivable by the retainer with the first elastic device in the restrain configuration to lock the first elastic device against moving to the release configuration. The locking sleeve may be selectively operated by an operating system, connected to the locking sleeve, that selectively inserts the locking sleeve into the retainer and withdraws the locking sleeve from the retainer.

The retardation of translational movement of one body relative to another body provided by the present invention is by way of mechanical engagement of the first elastic device received within the one or more grooves of the cylindrical surface, and longitudinal force is applied to one body relative to the other body to distort the elastic device and force it out of engagement with the one or more grooves.

A method of the invention includes the step of preventing relative translation between the first and second bodies by the first elastic device residing in the one or more grooves of the cylindrical surface in a restrain configuration, and applying longitudinal force to distort the first round elastic device and push it out of the one or more grooves of the cylindrical surface to a release configuration to allow relative translation between the first and second bodies. In a method in which the first elastic device is provided structured with a lead and a groove comprising a thread that receives the first elastic device is provided in the cylindrical surface, rotational movement between the first and second bodies aligns the first elastic device with the thread to remove longitudinal slack between the first and second bodies in the restrain configuration.

The present invention provides a significant resistance to translation of a rod, with the resistance being consistent and of a magnitude to effectively lock the rod in place as desired. A positive lock of the rod in a fixed position is also provided.

As used herein, the terms "retarding" and "braking" denote resisting or slowing movement, and stopping or preventing movement. Thus, a "brake" as used herein may resist movement and prevent movement, but which can be moved to a release configuration to allow movement. A "lock," or locking device may be used to positively hold a brake in a configuration in which the brake prevents movement and cannot move to a release configuration. Also, the term "rod" is used herein in a general sense to describe a body that can be circumscribed by another body, and is a body or portion of a body of any shape that can be so circumscribed; an elongate shape, such as that of a rod, would be a convenient shape for this purpose and is so referred to for simplicity of description.

BRIEF DESCRIPTION OF THE DRAWINGS

FIGS. 12–15 are side elevations similar to FIGS. 2–5, but showing a rod brake employing split rings rather than a coil spring;

FIGS. 18 and 19 are enlarged, fragmentary cross sections showing different cross-sectional profiles of the rings and grooves that can be used in the rod brake of FIGS. 12–15.

FIGS. 42, 43, 45 and 46 are side elevations similar to FIGS. 2–5, but showing a rod brake employing an elastic sleeve;

FIG. 44 is an enlarged, fragmentary cross section of an elastic sleeve, having an internal thread, that can be used with the rod brake of FIGS. 42, 43, 45 and 46; and FIG. 47 is an isometric view of an elastic sleeve, having internal grooves, that can be used with the rod brake of FIGS. 12–15;

DETAILED DESCRIPTION OF PRESENTLY PREFERRED EMBODIMENTS

The present invention is illustrated and described herein in multiple preferred embodiments.

Figure 1:
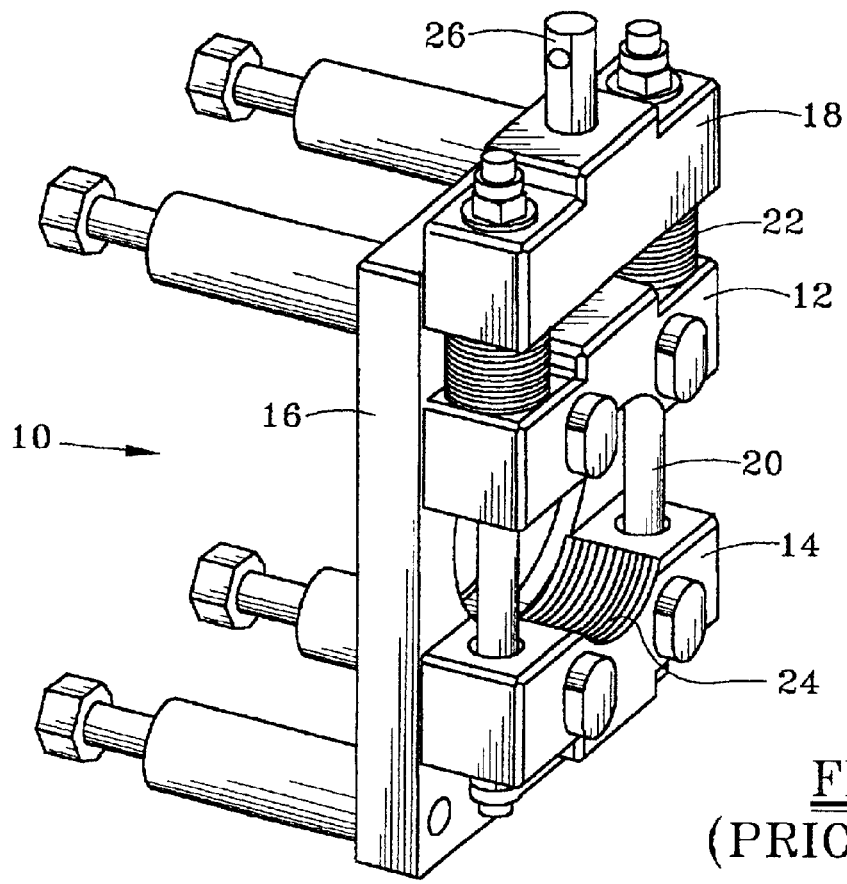
FIG. 1 is an isometric view of a prior art device discussed above.
Figure 2:
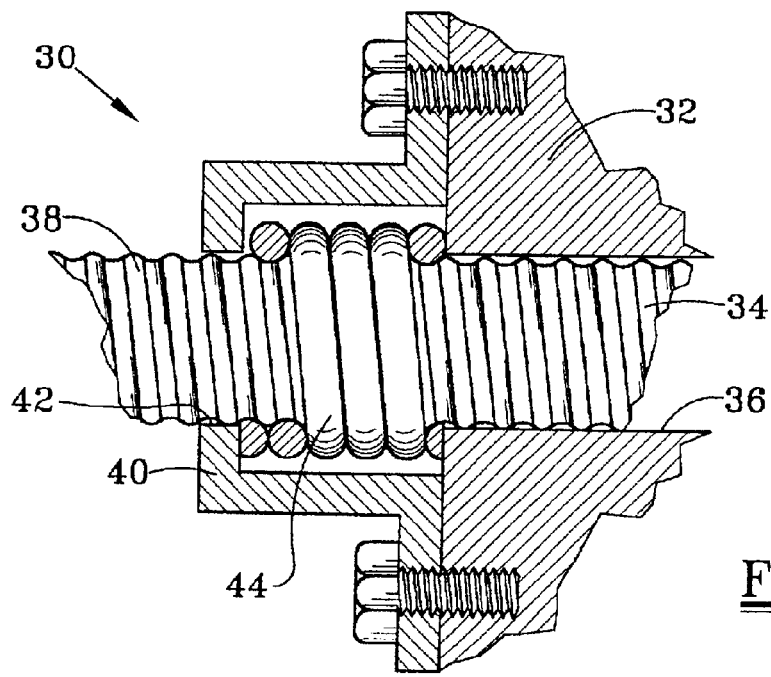
FIGS. 2 and 3 are side elevations in partial section of a rod brake according to the present invention in two configurations.
Figure 3:
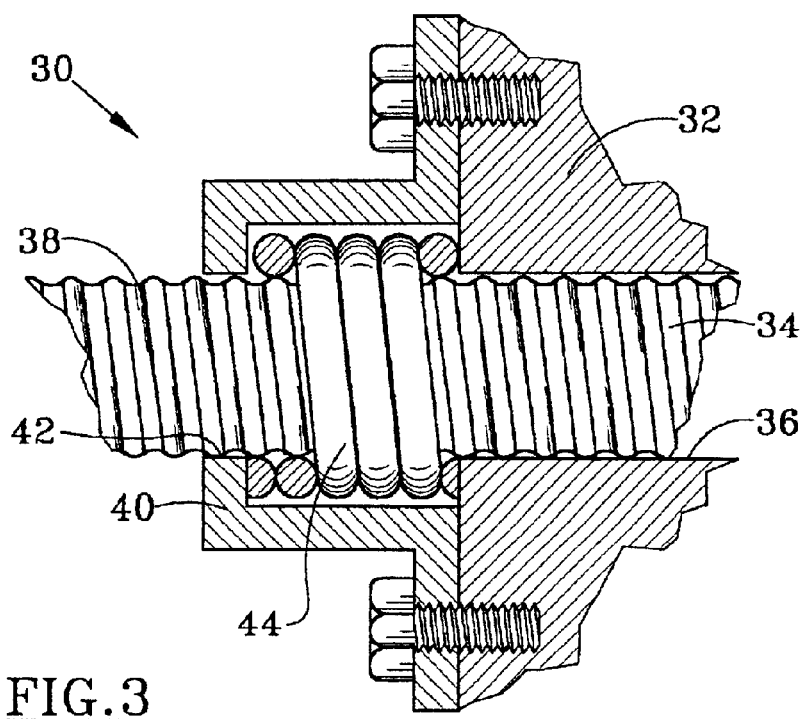

A rod brake according to the present invention is shown generally at 30 in FIGS. 2 and 3. A first body 32 circumscribes a second body 34, which is located within a passage 36 through the first body. Only a portion of the first body 32, and a portion of the second body 34, shown as a rod, are illustrated.

As in all of the embodiments of the present invention illustrated and described herein, the first body may be of any shape that includes a structure that provides for the first body to circumscribe the second body and allows for the second body to move longitudinally relative to the first body. Likewise, the second body may be of any shape that includes a structure that enables the second body to be circumscribed by the first body and allows for the second body to move longitudinally relative to the first body. For each embodiment herein, a portion, including the structure of a passage, of an otherwise undetermined first body is illustrated, and a portion of an elongate member, or rod, is illustrated as part of an otherwise undetermined second body. It is understood that the remainder of the first body and the remainder of the second body may take any appropriate shapes. Further, for purposes of discussion, the second body is identified only by the term "rod" where "second body" is not used.

The first body includes a passage 36 in which the second body 34 resides. The second body 34 is shown as an elongate rod having a single helical groove, or thread, 38 on its outer cylindrical surface. A retainer in the form of a cap 40 is bolted to the first body 32. The cap 40 has a central opening 42 aligned with the passage 36 so that the rod 34 also passes through the cap. A round elastic member in the form of a coil spring 44 circumscribes the rod 34 and has the same pitch as the thread 38 so that the spring may be received within the thread. The spring 44 is held tightly against the rod 34 by the geometry and elastic constant of the spring so that the spring resides within the thread 38 as shown in FIG. 2, in the spring's most relaxed, or least strained, configuration circumscribing the rod 34.

The coil spring 44 is located within the cap 40, and is too large to pass through the cap central opening 42 or to enter the first body passage 36. Further, the spring 44 extends from the end of the interior of the cap 40 the end of the first body 32. Except for the presence of the spring 44 residing in the thread 38, the rod 34 is movable longitudinally relative to the first body 32 along the passage 36. However, the coil spring 44 is restrained by the cap 40 and the end of the first body 32 against such movement relative to the first body. Therefore, the spring 44 residing in the thread 38 prevents the rod 34 from translating longitudinally relative to the first body 32 in either direction.

As longitudinal force is applied to the rod 34 to the right, as viewed in FIG. 2, relative to the first body 32, equal longitudinal force is applied to the spring 38 in the opposite direction by the end of the first body, pressing the spring coils against the side of the thread. The magnitude of the force by which the spring presses against the side of the thread is equal to the magnitude of the longitudinal force applied to the rod 34, with the result that the rod remains locked in place relative to the first body 32. However, as the magnitude of the longitudinal force between the spring 44 and the thread 38 increases, the spring will tend to ride up the side of the thread, expanding in the process, until the applied force overcomes the elastic forces within the spring. At that point, the spring 44 is distorted, that is, radially expanded, and forced out of the thread 38, and rests against the thread crest in the release configuration shown in FIG. 3. Then, the rod 34 moves longitudinally along the passage 36 relative to the first body 32, driven by the longitudinal force applied to the rod. As long as sufficient longitudinal force is applied to the rod 34, the spring 44 will be forced out of the thread 38 and the rod may so move relative to the first body 32. Insufficient longitudinal force will allow the spring 44 to relax back into the thread 38 in the restrain configuration of FIG. 2 wherein the rod 34 is prevented from longitudinal movement relative to the first body 32.

Longitudinal translation of the rod 34 relative to the first body 32 toward the left as viewed in FIG. 2 is similarly restrained by the coil spring 44 reacting within the thread 38. In this scenario, it is the cap 40 that applies force to the spring 44, causing the spring to press against the side of the thread 38 toward the right as viewed in FIG. 2. Again, sufficient force applied to the rod 34 toward the left will cause the spring 44 to ride up the side of the thread 38 to the release configuration of FIG. 3, allowing the rod to be moved to the left relative to the first body 32. As long as sufficient longitudinal force is applied to the rod 34, the spring 44 will be forced out of the thread 38 and the rod may so move relative to the first body 32. Insufficient longitudinal force will allow the spring 44 to relax back into the thread 38 in the restrain configuration of FIG. 2 wherein the rod 34 is prevented from longitudinal movement relative to the first body 32.

Figure 4:
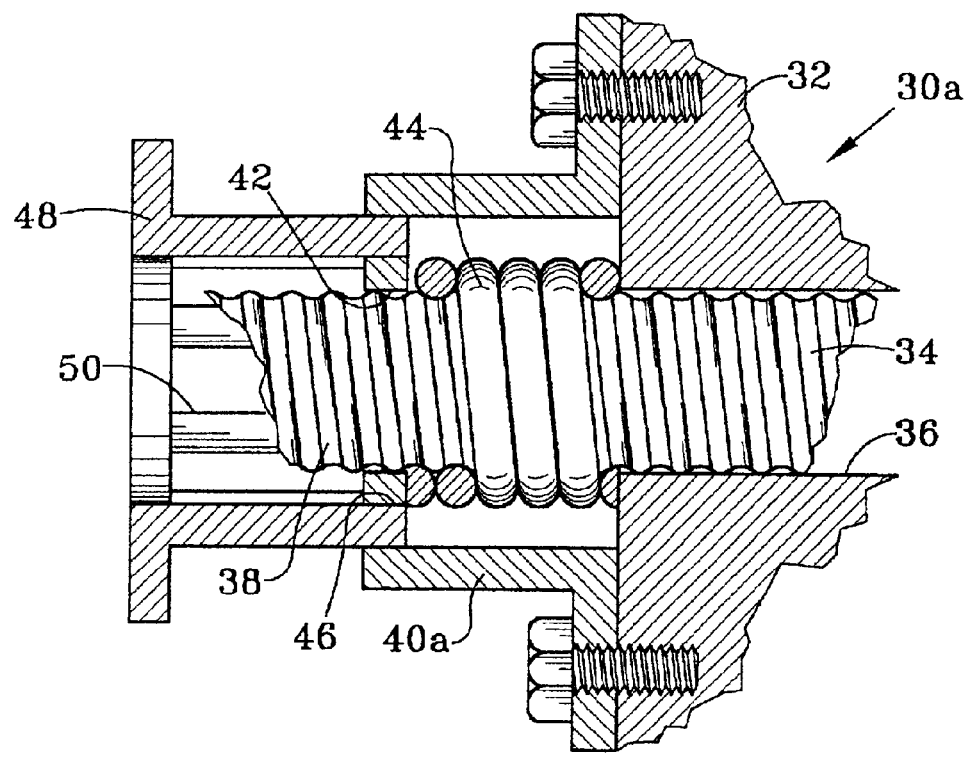
FIGS. 4 and 5 are side elevations in partial section of the rod brake of FIGS. 2 and 3, with a locking sleeve shown in two different configurations.
Figure 5:
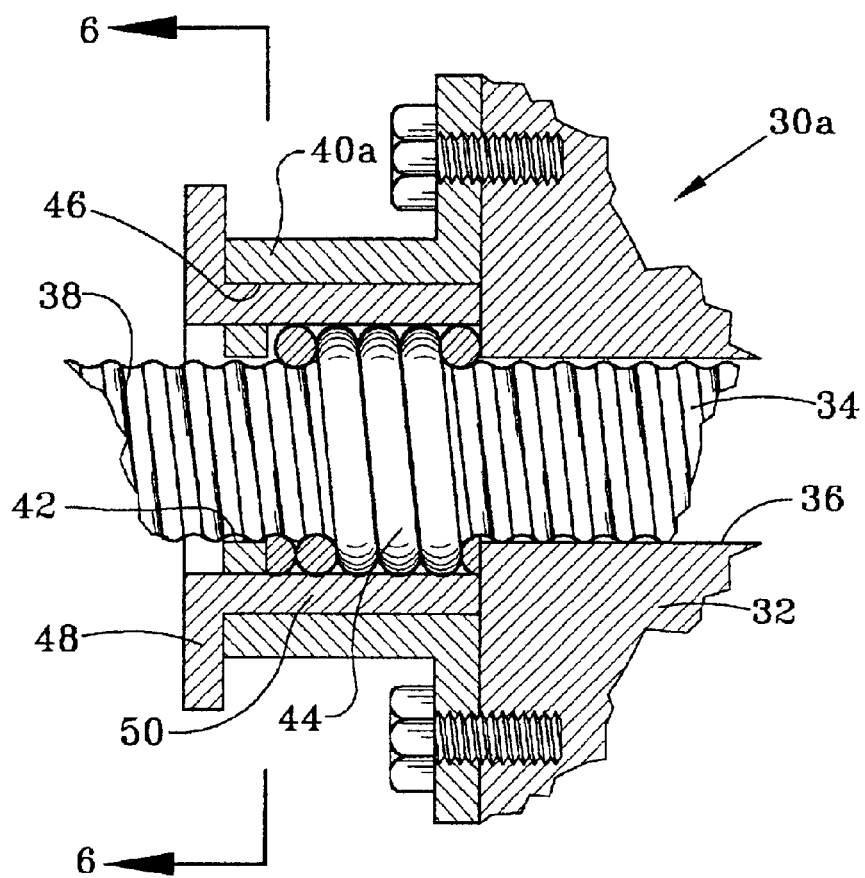
Figure 6:
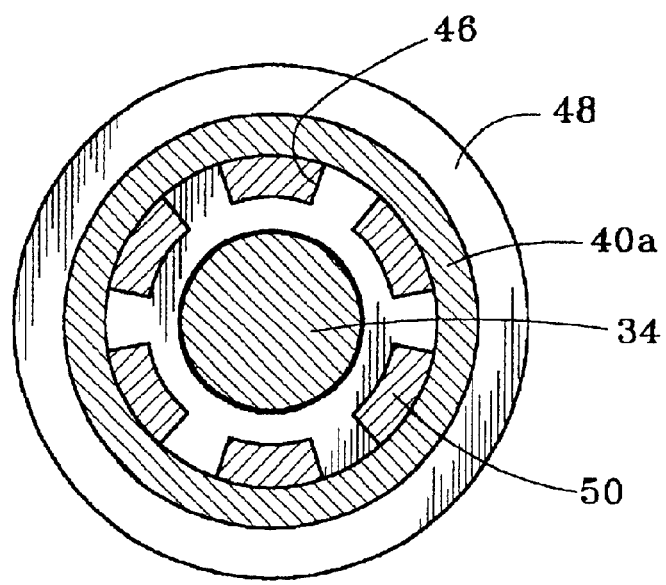
FIG. 6 is a cross section taken along line 6—6 in FIG. 5.
Figure 7:
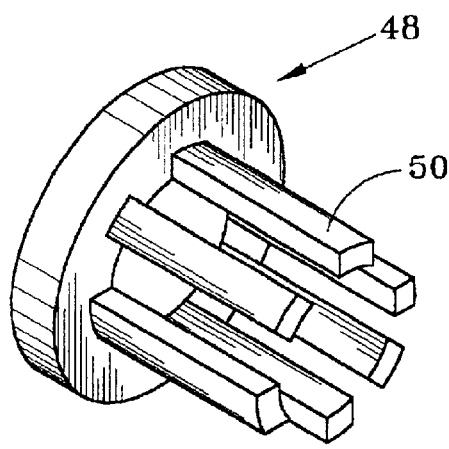
FIG. 7 is an isometric view of the locking sleeve of FIGS. 4–6.

FIGS. 4 and 5 show a modification of the rod brake of FIGS. 2 and 3, indicated generally as 30a. In both FIGS. 4 and 5 the coil spring 44 resides in the thread 38 of the rod 34, restraining the rod against longitudinal translation relative to the first body 32 in either direction along the passage 36. A wider cap 40a is bolted to the first body to contain the spring 44. The cap 40a includes six slots 46 around its end, as may be appreciated by reference to FIG. 6. A generally cylindrical locking sleeve 48 is castellated, having six legs, as shown clearly in FIG. 7 wherein the locking sleeve is indicated generally at 48. The locking sleeve legs 50 are sized and oriented so as to be received in the cap slots 46. In FIG. 4, the sleeve 48 is positioned with its legs 50 received within the cap slots 46, but not extending within the interior of the cap. Thus, in the arrangement of FIG. 4, the spring 44 is in the restrain configuration to restrain the rod 34 from longitudinal translation relative to the first body 32, but the spring can be forced out of the thread 38 to allow the rod to be moved. In the arrangement of FIGS. 5 and 6, the sleeve 48 has been advanced so that the legs 50 extend through the slots 46 into the interior of the cap 40a all the way to the first body 32, and overlie the spring 44. In this configuration, the spring 44 is prevented by the legs 50 from being forced out of the thread 38. Consequently, in the lock configuration of FIGS. 5 and 6, the rod 34 is locked against longitudinal translation relative to the first body.

Three configurations can be identified for a rod brake according to the present invention: a restrain configuration as shown in FIGS. 2 and 4, wherein the rod 32 is restrained from longitudinal movement, but sufficient force can be applied to overcome the restraint; a release configuration, as shown in FIG. 3 wherein the rod is free to move longitudinally; and a lock configuration, as shown in FIGS. 5 and 6, wherein the rod cannot be moved longitudinally under any amount of force.

For purposes of illustration, the release configuration is shown in FIG. 3 with the spring 44 positioned on the crest of the thread 38. However, from the description above, it will be appreciated that the release configuration is generally a dynamic condition. That is, as long as sufficient longitudinal force is applied the rod 34 will translate relative to the first body 32 with the spring 44 skipping over the turns of the thread 38. When the magnitude of the force propelling the translation of the rod 34 falls below that which is required to drive the spring 44 out of the trough of the thread 38, the spring will slip back into the restrain configuration of FIG. 2. If the propelling force ceases to move the rod 34 when the rod is so positioned relative to the first body, for example, that the spring 44 is on the crest of the thread 38, then the spring will come to rest in that position as illustrated in FIG. 3. Then, the rod 34 will be free to move relative to the first body 32 in either direction until the spring 44 is pushed off of the crest of the thread 38 and contracts into the trough of the thread. Thus, a slack between the rod 34 and the first body 32 equal to half of the thread lead in each direction will be produced. This slack can be reduced and even eliminated by rotational motion between the rod 34 and the first body 32 about the longitudinal axis of the rod to align the spring 44 with the trough of the thread 38 so that the spring engages with the thread in the restrain configuration of FIG. 2 without any further longitudinal movement between the rod and the first body. The rotational movement can be in either sense, that is, right-hand or left-hand, up to a half turn to advance the spring 44 relative to the thread 38 up to one half the lead of the spring and the thread in the respective direction. This feature of reducing or eliminating the possible slack between the first and second body is available with all of the rod brake embodiments disclosed herein that incorporate a thread, and should be understood even though the release configuration is of necessity illustrated in all cases in a static drawing.

The elasticity of the coil spring 44 provides a resistance factor that restrains the rod 34. The amount of resistance provided by the spring 44 depends on the elastic modulus of the spring as well as the geometry of the spring. A stiffer spring provides more resistance. A spring with more turns provides more spring elasticity, and therefore provides more resistance. A spring design may be chosen depending on the amount of resistance needed as well as any size restrictions that may be dictated by the application in which the rod brake is used. In general, the amount of resistance is dependent on the spring design.

Figure 8:
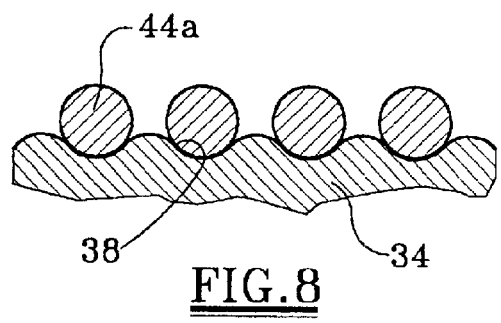
FIGS. 8 and 9 are enlarged, fragmentary cross sections showing different forms of the spring that can be used in the rod brake of FIGS. 2–5.
Figure 9:
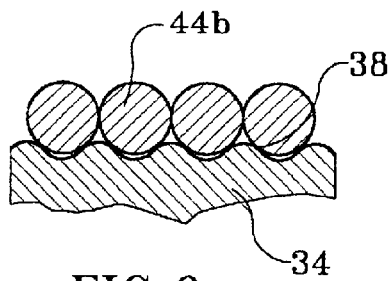

FIG. 8 shows a spring 44a with turns that do not mutually touch. FIG. 9 shows a spring 44b that is sized so that, in the restrain configuration, the turns of the spring do not reach to the root of the rod thread 38.

Figure 10:
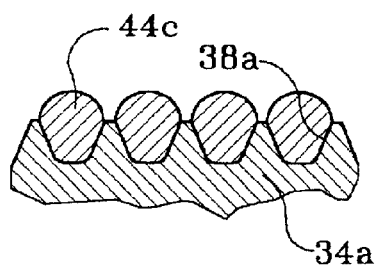
FIGS. 10 and 11 are enlarged, fragmentary cross sections showing different cross-sectional profiles of the spring and thread that can be used in the rod brake of FIGS. 2–5.

Another factor that determines the amount of resistance a rod brake provides against movement of the rod is the combination of the design of the thread and the design of that part of the spring that contacts the thread. The amount of force required to push the spring 44 out of the thread 38 is determined, in part, by these shapes. FIGS. 2–5 illustrate a round thread 38 and a round spring 44, that is, a spring with a lateral cross section that is round. FIG. 10 shows a box-type thread 38a on the rod 34a. The spring 44c has a complimentary box-type shape on that part of the spring that fits into the thread 38a. It will be appreciated that the box shapes of FIG. 10 may provide more resistance to moving the spring 44c out of the thread 38a to the release configuration than is provided by round shapes. The slope of the side of the box thread 38a may be varied, as well as the slopes of the profile of the spring 44a to further alter the resistance these shapes determine.

Figure 11:
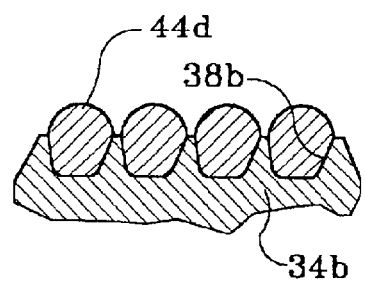

Further, the thread shape and the spring cross section need not be symmetric. FIG. 11 illustrates another box-type thread 38b on a rod 34b. The thread 38b, however, is not symmetric, having one side with a slope that is steeper than the slope of the other side. The coil spring 44d that fits in the thread 38b is complimentary to the thread, having sides with different slopes as well. It will be appreciated that greater longitudinal force is required to move the spring 44d out of the thread 38b when the spring is pressed toward the left as viewed in FIG. 11 compared to the force required to release the spring with longitudinal force to the right. Such asymmetrical force factors may be desired for a particular application.

Finally, the thread and that part of the spring profile that is received within the thread need not be complimentary. FIG. 9 is just one example of such a non-complimentary combination.

Figures 16, 17:
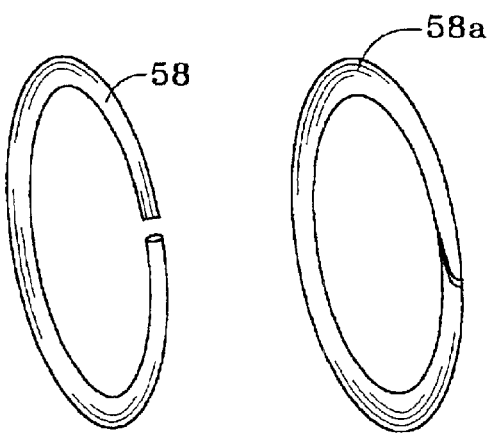
FIGS. 16 and 17 are isometric views of two types of split rings that can be used in the rod brake of FIGS. 12–15.
Figure 14:
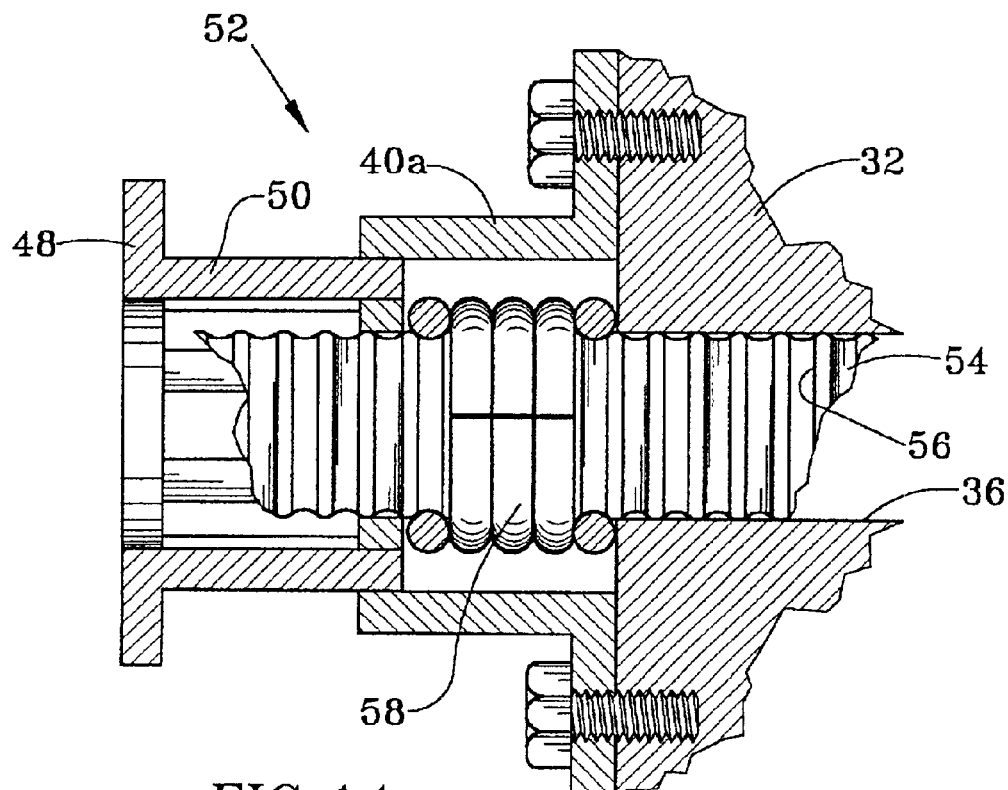
Figure 15:
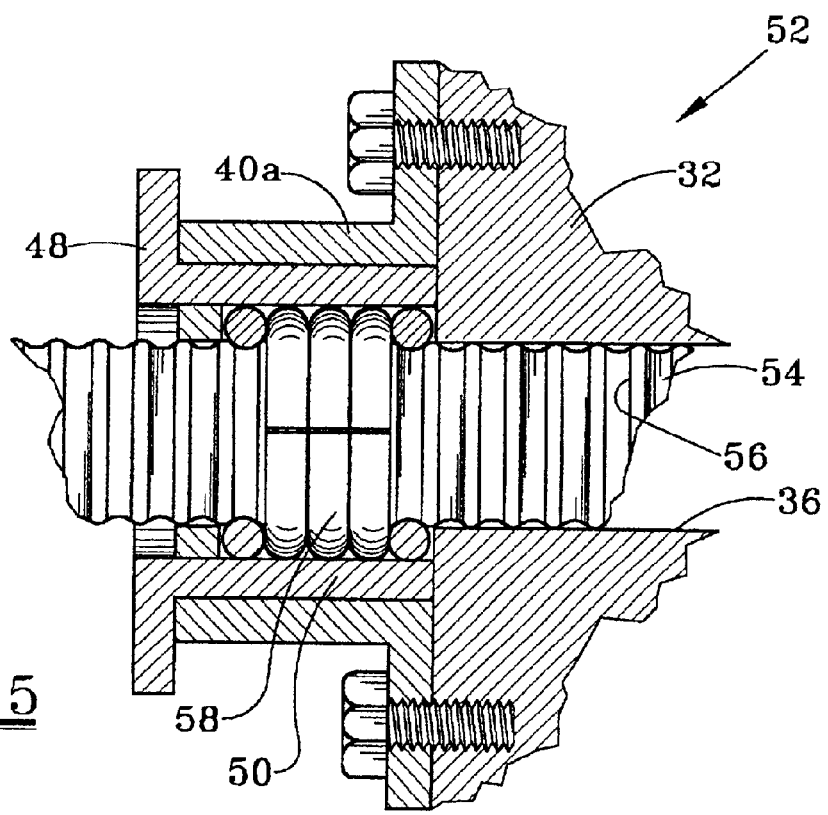

Another version of a rod brake according to the present invention is shown generally at 52 in FIGS. 12 and 13. The rod brake 52 differs from the rod brake 30 of FIGS. 2 and 3 in that the rod brake 52 features a rod 54 that has an outer surface that is structured with circular grooves 56 rather than a thread, and the round elastic device is in the form of an array of split rings 58 that are received by the grooves in the restrain configuration of FIG. 12. Again, the rings 58 extend from end to end within the interior of the cap 40 and are thus fixed against longitudinal movement relative to the first body 32. Each ring 58 circumscribes the rod 54, but has a split as can be seen in FIGS. 12 and 13. The operation of the rod brake 52 is the same as the operation of the rod brakes 30 and 30a, except that sufficient longitudinal force applied to the collection of rings 58 by the end of the first body 32, for movement of the rod 54 to the right, or sufficient longitudinal force applied to the array of rings by the end of the cap 40, for movement of the rod to the left distorts the rings, that is, radially expands them, and drives them out of the grooves 56 to the release configuration illustrated in FIG. 13. Note that the splits in the rings 58 are wider in FIG. 13 to accommodate the expansion of the rings out of the grooves 56. The locking sleeve 48 is shown added to a the wider cap 40a in FIGS. 14 and 15, with the sleeve advanced into the cap in FIG. 15 to prevent expansion of the rings 58 out of the grooves 56, and establishing the lock configuration Again, a force factor determining how much longitudinal force must be applied to the rod 54 in the restrain configuration of FIG. 12 to expand the rings 58 out of the grooves 56 is the elasticity of the rings. More rings 58 increases the force required to release the rod 54 for longitudinal movement, as does stiffer rings. One of the split rings 58 is further illustrated in FIG. 16. FIG. 17 illustrates a variation of the split ring 58a having a diagonal split.

Also, the profile of the grooves and the profile of the rings can be varied to alter the amount of force needed to move the rings out of the grooves. In FIG. 18, circular grooves 56a having box-type profiles are shown formed in the cylindrical surface of the rod 54a. Two rings 58b are illustrated having complementary profiles that are received in the grooves 56a. In FIG. 19, circular grooves 56b having asymmetric box-type profiles are shown formed in the cylindrical surface of the rod 54b. Two rings 58c are illustrated having complementary asymmetrical profiles that are received in the grooves 56b. The grooves 56a and 56b, with the corresponding rings 58b and 58c, respectively, affect the force required to release the rings from the respective grooves in much the same way as the springs 44c and 44d and corresponding threads 38a and 38b of FIGS. 10 and 11 are affected. Finally, the ring profiles do not have to be complementary to the groove profiles as discussed above in the matter of springs and threads.

Figure 20:
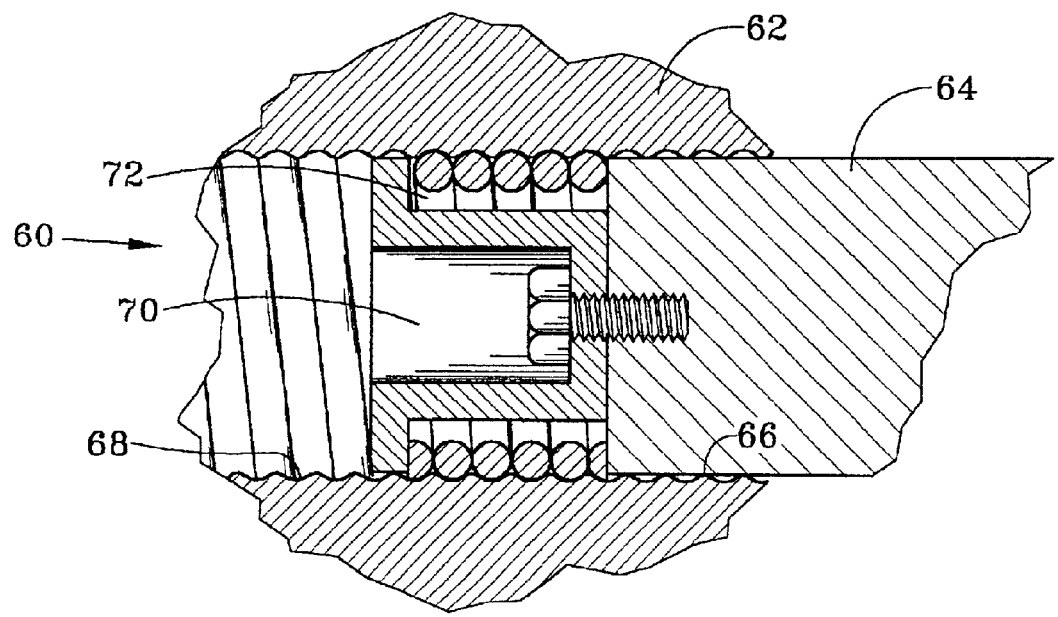
FIGS. 20–23 are side elevations similar to FIGS. 2–5, but showing a rod brake employing an internal threaded surface receiving a coil spring that is carried with the rod.
Figure 21:
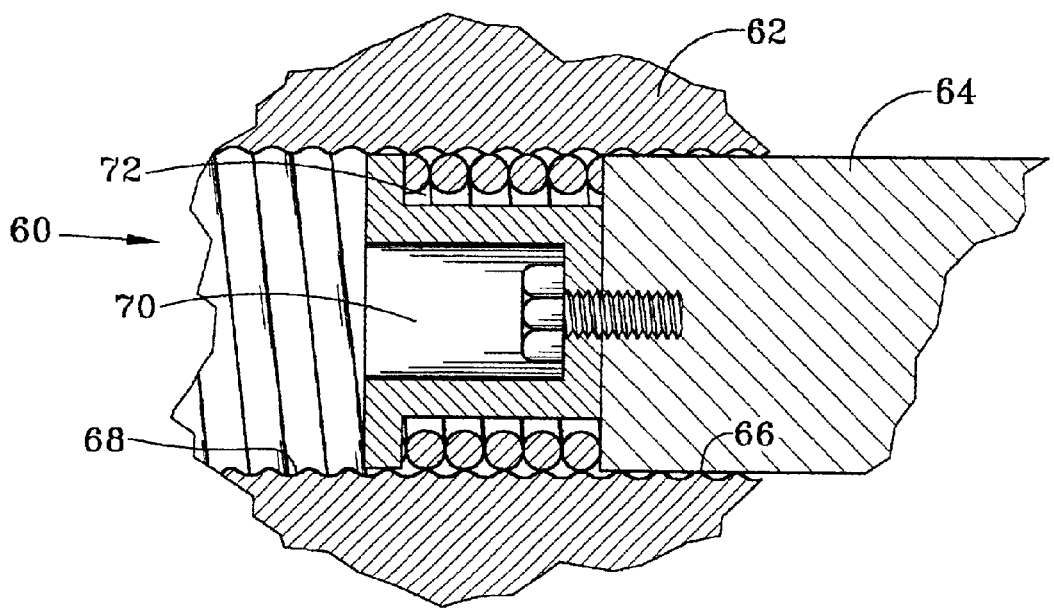

A rod brake according to the present invention is not limited to structures wherein the rod moves within an elastic device that is longitudinally fixed relative to the first body. FIGS. 20 and 21 illustrate a rod brake, shown generally at 60, wherein a first body 62 circumscribes a rod 64 within a passage 66. The interior surface of the passage 66 is structured with a thread 68. The rod 64 is longitudinally movable within the passage 66 relative to the first body 62. A retainer in the form of sleeve 70 is bolted to the end of the rod 64. A round elastic device in the form of a coil spring 72 circumscribes the sleeve 70 between the wider end of the sleeve and the end of the rod 64. Therefore, the spring 72 is restrained by the sleeve 70 and the rod 64 to move longitudinally with the retainer sleeve and the rod relative to the first body 62. The spring 72 has the same pitch as the thread 68 of the passage 66 so that the spring may be received within the thread. The spring 72 is held tightly against the side of the passage 66 of the first body 62 by the geometry and elasticity of the spring so that the spring resides within the thread 68 as shown in FIG. 20, in the spring's most relaxed, or least strained, configuration.

Longitudinal force applied to move the rod 64, relative to the first body 62, either to the right or to the left as viewed in FIG. 20, is resisted by the spring 72 pressing against the side of the thread 68 of the first body passage 66 in the same direction as the force applied to try to move the rod. If the magnitude of the external force applied to move the rod 64 is sufficiently large, the spring 72 will be forced radially inwardly and out of the thread 68 of the passage 66, transforming the rod brake 60 from the restrain configuration of FIG. 20 to the release configuration of FIG. 21. Then, as long as the magnitude of the longitudinal force tending to move the rod 64 is sufficient, the spring 72 will not be allowed to reside in the thread 68 of the passage 66, and the rod will be able to be moved longitudinally relative to the first body 62.

Figure 22:
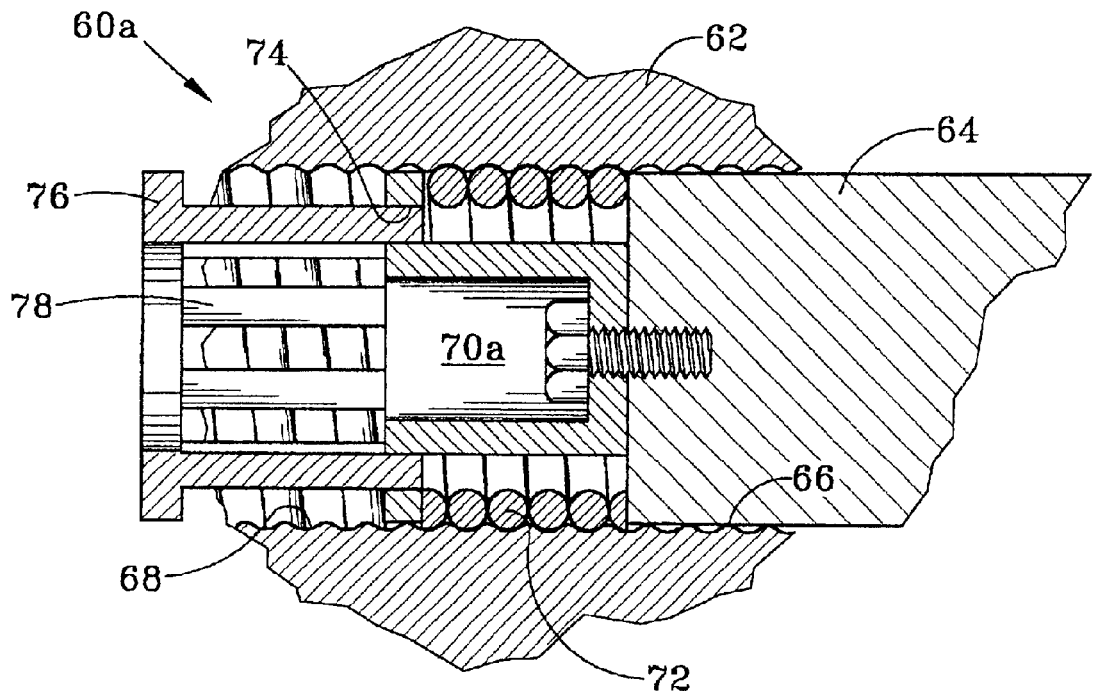
Figure 23:
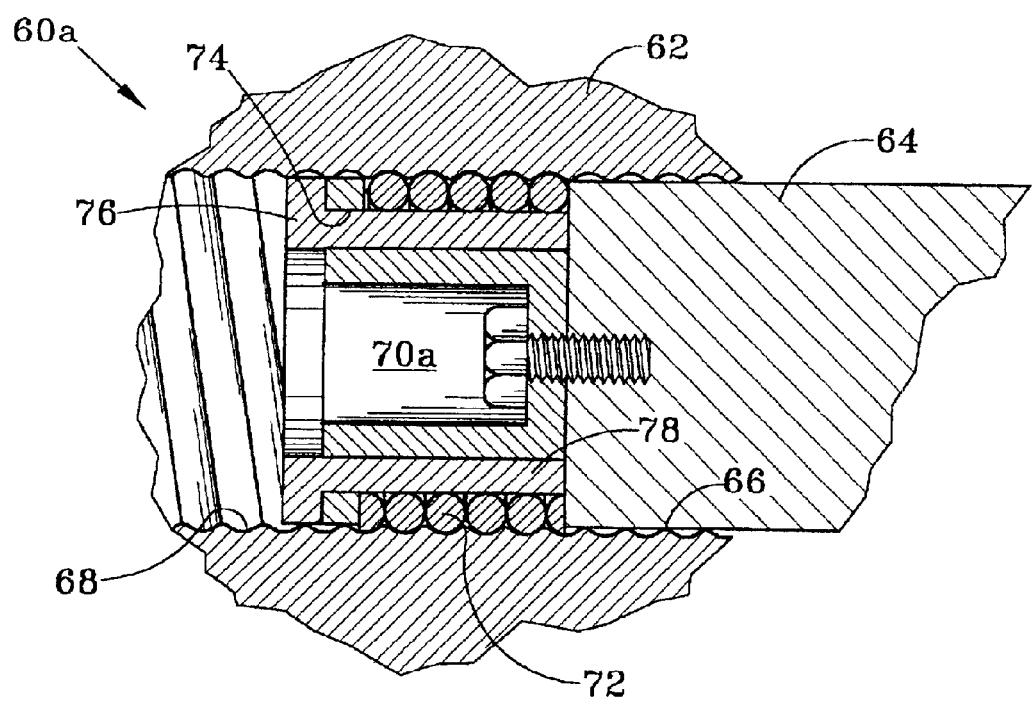

A modified version of the rod brake 60 is shown generally at 60a in FIGS. 22 and 23. In both FIGS. 22 and 23 the coil spring 72 resides in the thread 68 of the first body 62, restraining the rod 64 against longitudinal translation relative to the first body in either direction along the passage 66. A wider retainer sleeve 70a is bolted to the rod 64 to contain the spring 72. The cap 70a includes six slots 74 around its end, similar to the construction of the cap 40a of FIGS. 4–6. A generally cylindrical locking sleeve 76 is castellated, having six legs 78 as in the construction of the locking sleeve 48 shown in FIG. 7. The locking sleeve legs 78 are sized and oriented so as to be received in the slots 74. In FIG. 22, the locking sleeve 76 is positioned with its legs 78 received within the slots 46, but not extending within the interior of the retainer sleeve 70a. Thus, in the arrangement of FIG. 22, the spring 72 is in the restrain configuration to restrain the rod 64 from longitudinal translation relative to the first body 62, but the spring can be forced out of the thread 68 to the release configuration to allow the rod to be moved. In the arrangement of FIG. 23, the locking sleeve 76 has been advanced so that the legs 78 extend through the slots 74 into the interior of the retainer sleeve 70a all the way to the second body 64, and underlie the spring 72. In this configuration of FIG. 23, the spring 72 is prevented by the legs 78 from being forced radially inwardly, out of the thread 68. Consequently, in the locked configuration of FIG. 23, the rod 64 is lock against longitudinal translation relative to the first body 62.

The elasticity of the coil spring 72 provides a resistance factor that restrains the rod 64. The amount of resistance provided by the spring 72 depends on the elastic modulus of the spring as well as the geometry of the spring. A stiffer spring provides more resistance. A spring with more turns provides more spring elasticity, and therefore provides more resistance. A spring design may be chosen depending on the amount of resistance needed as well as any size restrictions that may be dictated by the application in which the rod brake is used. In general, the amount of resistance is dependent on the spring design.

Figure 24:
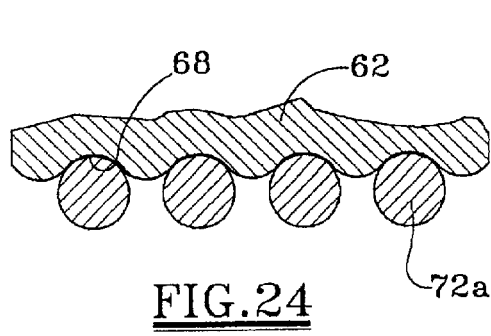
FIGS. 24 and 25 are enlarged, fragmentary cross sections showing different forms of the spring that can be used in the rod brake of FIGS. 20–23.
Figure 25:
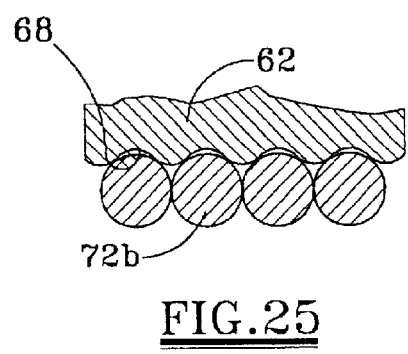

FIG. 24 shows a portion of the first body 62 and the interior thread 68 receiving a spring 72a with turns that do not mutually touch. FIG. 25 shows a spring 72b that is sized so that, in the restrain configuration, the turns of the spring are received in the thread 68 but do not reach to the root of the rod thread.

Figure 26:
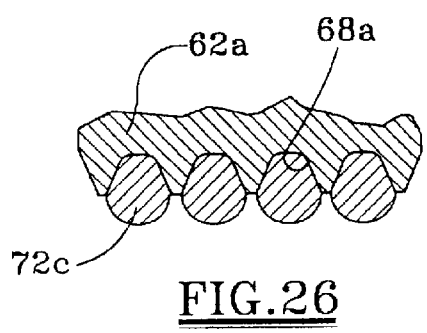
FIGS. 26 and 27 are enlarged, fragmentary cross sections showing different cross-sectional profiles of the spring and thread that can be used in the rod brake of FIGS. 20–23.
Figure 27:
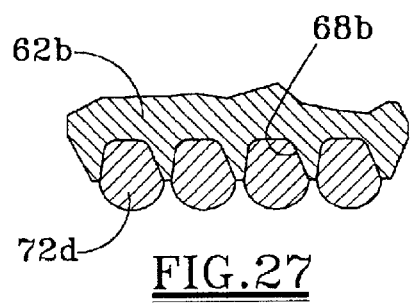

FIG. 26 shows a box-type thread 68a in the first body 62a, receiving a complimentary coil spring 72c, requiring greater longitudinal force to drive the spring out of the thread in either direction. FIG. 27 shows an asymmetrical thread 68b in the first body 62b, receiving complimentary spring 72d, requiring forces of different magnitudes to drive the spring out of the thread, depending on the direction of the longitudinal force.

Figure 28:
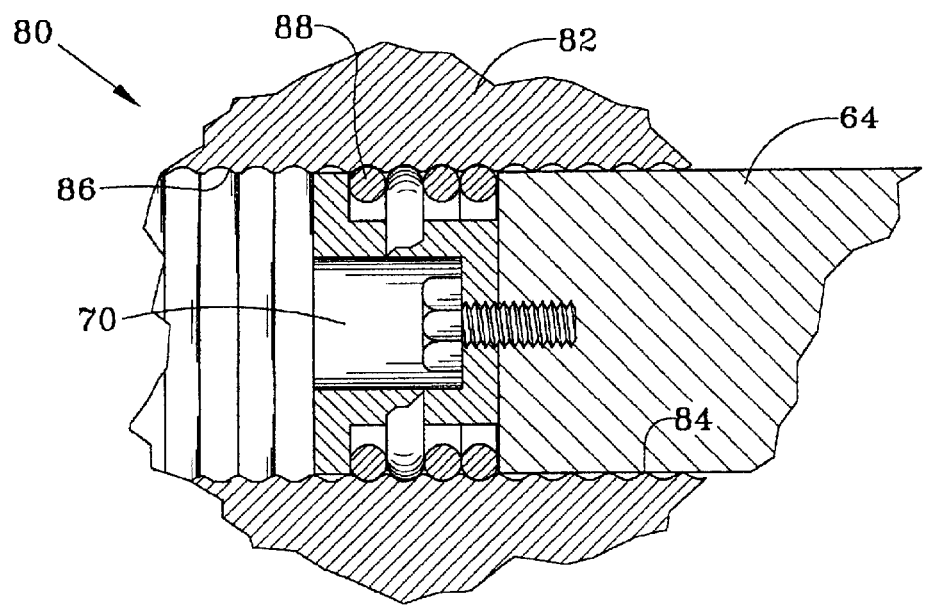
FIGS. 28–31 are side elevations similar to FIGS. 20–23, but showing a rod brake employing split rings rather than a coil spring.
Figure 29:
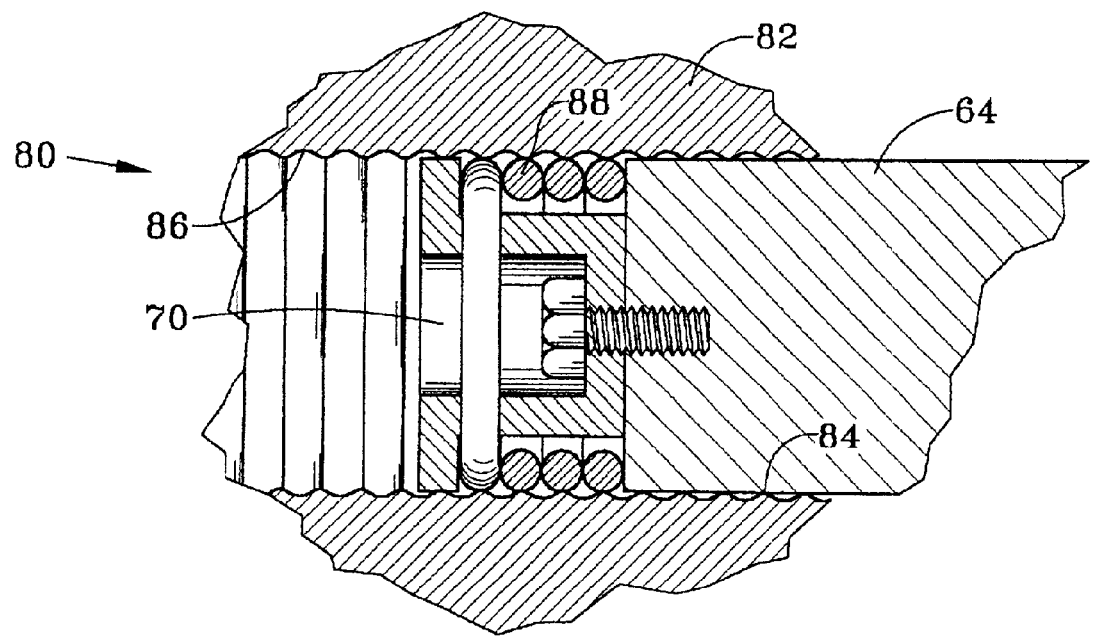

Yet another version of a rod lock is shown generally at 80 in FIGS. 28 and 29. In the rod brake 80, the rod 64, equipped with a retainer sleeve 70, is movable longitudinally relative to a first body 82 within a passage 84 through the first body. The interior surface of the passage 84 is structure with circular grooves 86. In FIG. 28, a round elastic device in the form of an array of snap rings 88 (four are illustrated) is contained within the retainer sleeve 70, and the rings reside in the circular grooves 86 of the passage 84 to hold the rod 64 against longitudinal movement relative to the first body 82 in the restrain configuration. As in the case of the spring 72 in FIGS. 20–24, the rings 88 press against the sides of the groove 86 to provide the force that so prevents longitudinal movement of the rod 64 relative to the first body 82.

FIG. 29, sufficient longitudinal force has been applied to the rod 64 relative to the first body 82 to distort the rings 88 and drive them radially inwardly and out of the grooves 86 of the passage 80 to allow the rod to move longitudinally relative to the first body in the release configuration. Then, as long as the magnitude of the longitudinal force tending to move the rod 64 is sufficient, the rings 88 will not be allowed to reside in the grooves 86 of the passage 86, and the rod will be able to be moved longitudinally relative to the first body 82.

Figure 30:
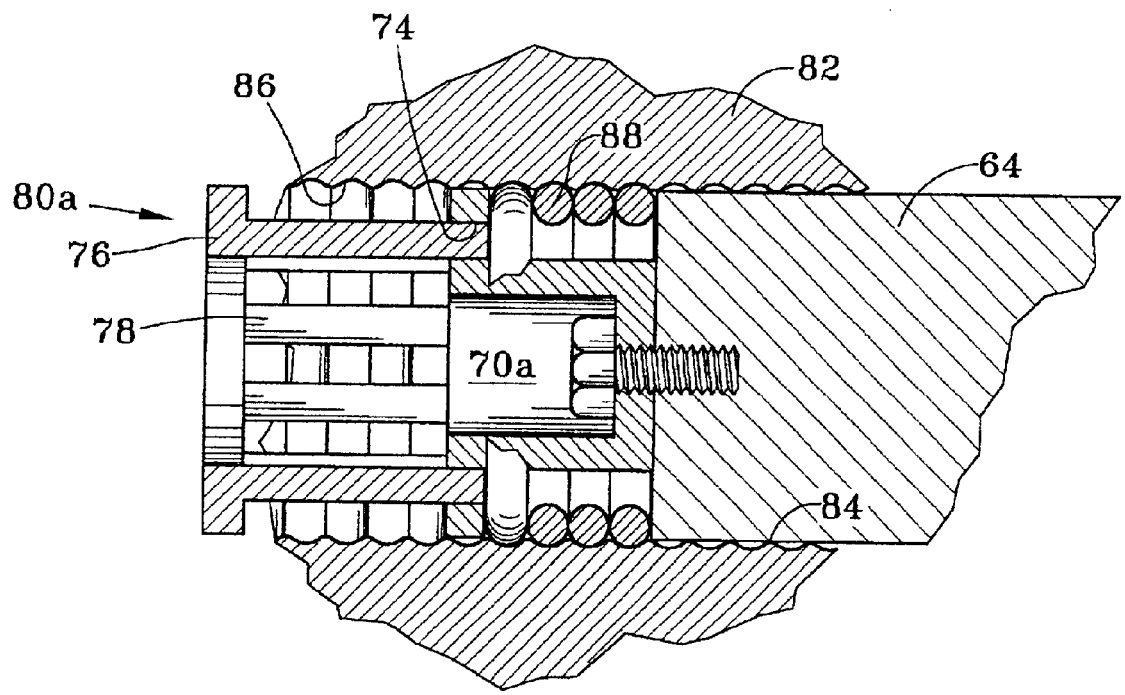
Figure 31:
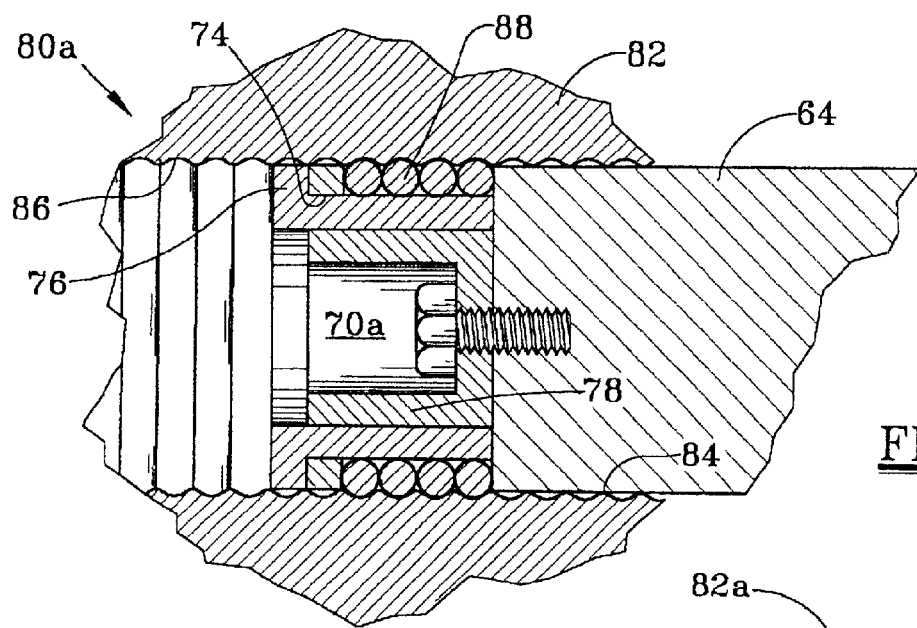

A modified version of the rod brake 80 is shown generally at 80a in FIGS. 30 and 31. In both FIGS. 30 and 31 the rings 88 reside in the grooves 86 of the first body 82, restraining the rod 64 against longitudinal translation relative to the first body in either direction along the passage 86. The wider retainer sleeve 70a is bolted to the rod 64 to contain the rings 88. The cap 70a has its six slots 74 to receive the legs 78 of the locking sleeve 76, just as in the case of the rod lock 60a illustrated in FIGS. 22 and 23. Thus, in the arrangement of FIG. 30, the rings 88 are in the restrain configuration to restrain the rod 64 from longitudinal translation relative to the first body 82, but the rings can be forced out of the grooves 86 to the release configuration to allow the rod to be moved. In the arrangement of FIG. 31, the locking sleeve 76 has been advanced so that the legs 78 extend through the slots 74 into the interior of the retainer sleeve 70a all the way to the second body 64, and underlie the rings 88. In this configuration of FIG. 31, the rings 88 are prevented by the legs 78 from being forced radially inwardly, out of the grooves 86. Consequently, in the lock configuration of FIG. 31, the rod 64 is locked against longitudinal translation relative to the first body 82.

The elasticity of the snap rings 88 provides a resistance factor that restrains the rod 64. The amount of resistance provided by the rings 88 depends on the elastic modulus of the rings as well as the geometry and number of rings. Stiffer rings provides more resistance. A greater number of rings 88 provides more elasticity, and therefore provides more resistance. A ring design may be chosen depending on the amount of resistance needed as well as any size restrictions that may be dictated by the application in which the rod brake is used. In general, the amount of resistance is dependent on the design of the collection of rings 88.

Figure 32:
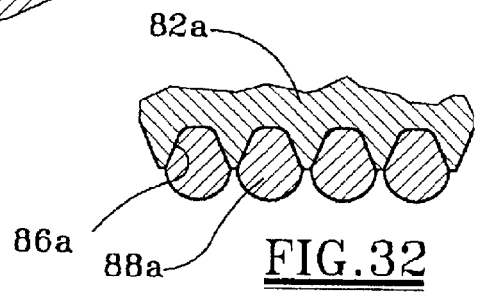
FIGS. 32 and 33 are enlarged, fragmentary cross sections showing different cross-sectional profiles of the rings and grooves that can be used in the rod brake of FIGS. 28–31.
Figure 33:
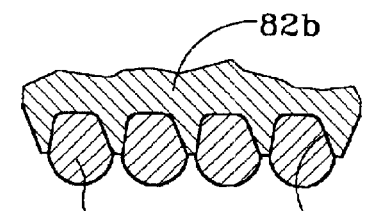

FIG. 32 shows box-type grooves 86a in the first body 82a, receiving an array of complimentary snap rings 88a, requiring greater longitudinal force to drive the rings out of the thread in either direction. FIG. 33 shows asymmetrical rings 86b in the first body 82b, receiving an array of complimentary snap rings 88b, requiring forces of different magnitudes to drive the rings out of the grooves, depending on the direction of the longitudinal force.

Figure 34:
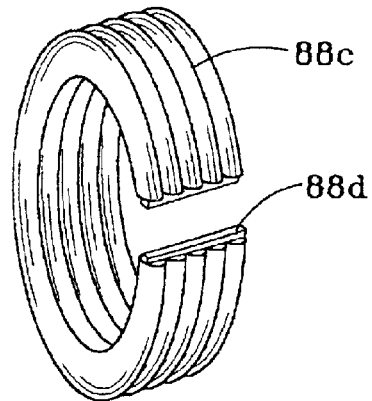
FIGS. 34 and 35 are two views of a ring pack that can be used in the rod brake of FIGS. 28–31.
Figure 35:
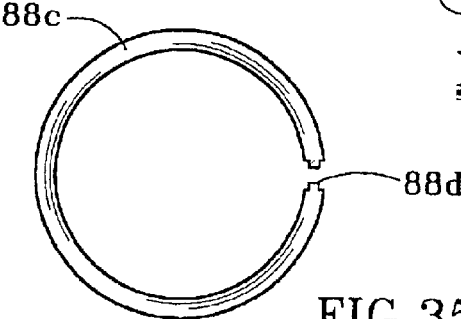

The rings 88, 88a and 88b may be in the general form of the ring 58 shown in FIG. 16, or the ring 58a shown in FIG. 17. Alternatively, FIGS. 34 and 35 show a construction of multiple rings 88c bonded together by end plates 88d. The rings 88c may actually be individual rings, and the end plates 88d added to the ends of the rings by welding or the like, or the rings and end plates may be a complete, integral construction, that is, may be of one piece of material, for example.

Advantages of the construction 88c include ease of handling the rings during assembly, and also uniformity of motion of the rings in expanding and contracting. The connected rings 88c of FIGS. 34 and 35 may be use in the rod brakes of FIGS. 12–15, wherein the rings expand to free the rod 54 for movement, as well as in the rod brakes of FIGS. 28–31 wherein the rings contract to free the rod 64 for movement.

Figure 36:
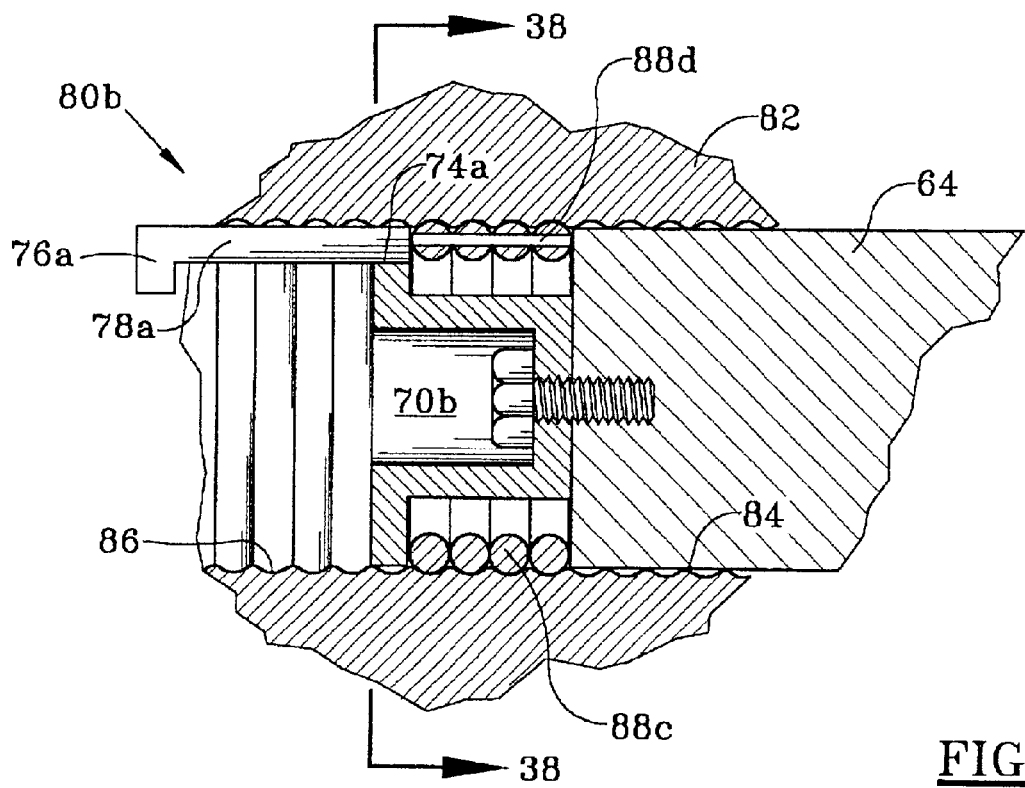
FIGS. 36 and 37 are side elevations similar to FIGS. 30 and 31, but showing a locking pin rather than a locking sleeve.
Figure 37:
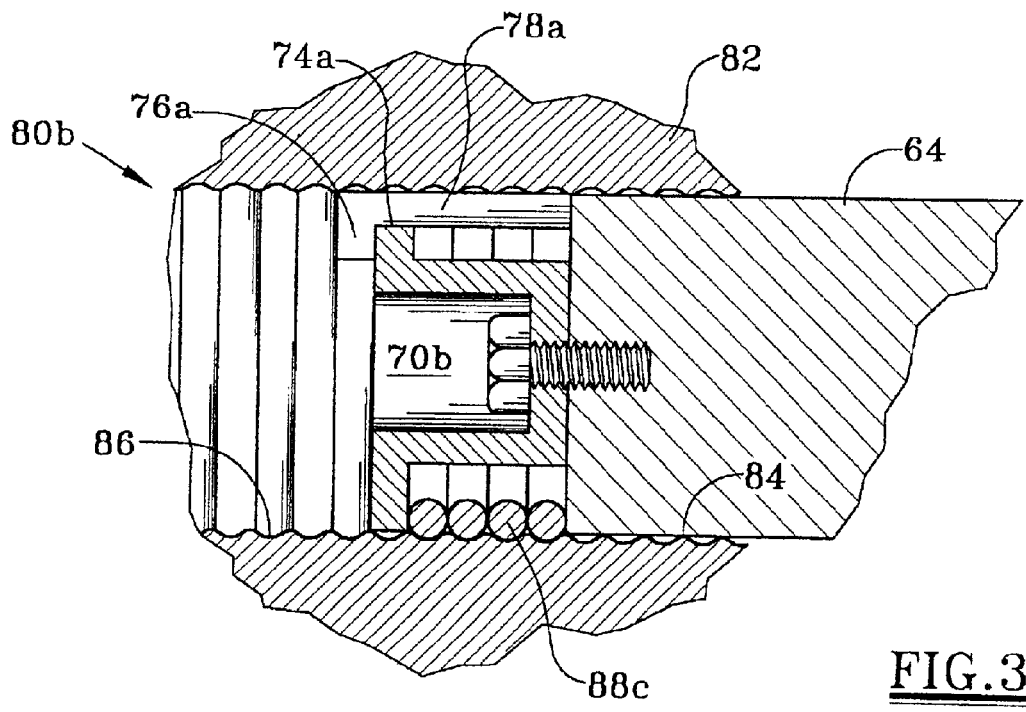
Figure 38:
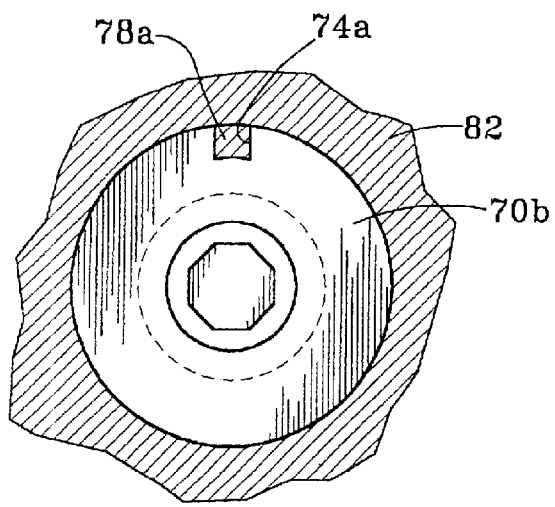
FIG. 38 is a cross section taken along line 38—38 in FIG. 36.
Figure 39:
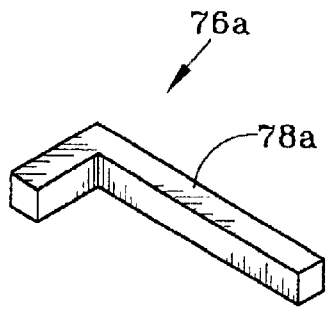
FIG. 39 is an isometric view of the locking pin of FIGS. 36–38.

The connected rings 88c of FIGS. 34 and 35 are employed in another version of a rod brake shown generally at 80b in FIGS. 36 and 37. In the restrain configuration of FIG. 36, the rod 64 is fitted with a cap 70b that is wide enough to accommodate a locking pin 76a having a shank 78a that is received in a slot 74a. FIG. 38 further illustrates how the pin shank 78a is positioned within the cap slot 74a, and FIG. 39 gives another view of the locking pin shown generally at 76a. The opening between the ring end caps 88d is aligned with the cap slot 74a. In the lock configuration of FIG. 37, the pin shank 78a has been inserted within the cap 70b all the way to the end of the rod 64, and is received between the ring end caps 88d, preventing the rings 88c from contracting out of the grooves 86 in the passage 84 through the first body 82. Thus, the pin 76a combines with the ring array 88c to lock the rod 64 against longitudinal movement relative to the first body 82.

Figure 40:
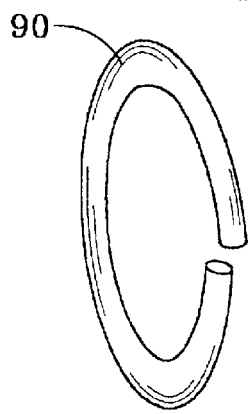
FIG. 40 is an isometric view of a single split ring with a lead that can be used in any of the rod brakes of the present invention that feature a threaded surface.
Figure 41:
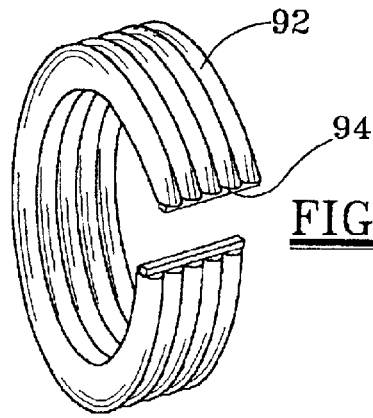
FIG. 41 is an isometric view of a split ring packet with a lead that can be used in any of the rod brakes of the present invention that feature a threaded surface.

In the rod brakes shown in FIGS. 2–5 and 20–23 wherein threads receive coil springs that either expand or contract to release the respective rod for longitudinal movement, snap rings having a pitch, or lead, may be used rather than the coil springs. FIG. 40 shows a single snap ring 90 with such a lead so that a plurality of such rings may be used in a threaded rod lock. FIG. 41 shows an array of rings 92 bonded together by end plates 94 and having a pitch so that the array may be used in a threaded rod brake. The rings 90 and 92 may be utilized whether the rings are to be expanded or contracted to release a rod for longitudinal movement relative to a first body.

Figure 42:
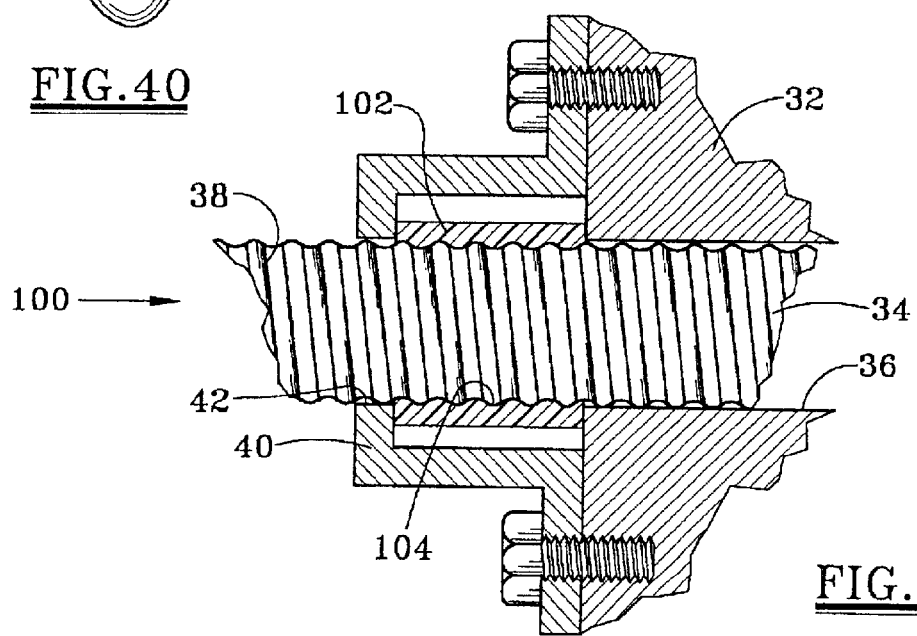
Figure 43:
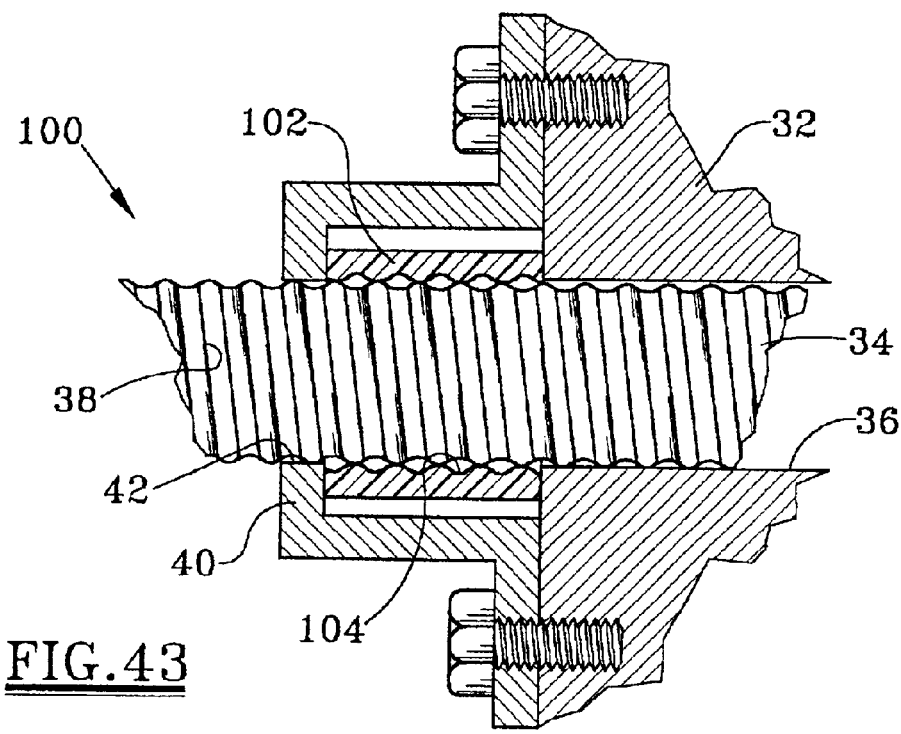

Another version of a rod brake according to the present invention is shown generally at 100 in FIGS. 42 and 43. The rod brake 100 differs from the rod brake 30 of FIGS. 2 and 3 in that the rod brake 100 features a round elastic device in the form of an elastic sleeve 102 that has an inner surface that is structured with a thread 104 to provide the elastic factor, as further illustrated in FIG. 44. The elastic sleeve 102 circumscribes the rod 34 within the passage 36 through the first body 32, and extends from end to end within the interior of the cap 40, engaging the rod thread 38 in the restrain configuration illustrated in FIG. 42. The operation of rod brake 100 is the same as the operation of rod brake 30 except that sufficient longitudinal force applied to the elastic sleeve 102 by either the end of the first body 32, for movement of the rod 34 to the right, or by the end of the cap 40, for movement of the rod to the left, drives the sleeve thread 104 out of the rod thread 38 from the restrain configuration of FIG. 42 to the release configuration illustrated in FIG. 43, distorting the elastic sleeve by radially expanding it. The locking sleeve 48 is shown added to the wider cap 40a of rod brake 100a in FIGS. 45 and 46, with the sleeve advanced into the cap in FIG. 46 to prevent expansion of the elastic sleeve 102 and removal of its thread 104 out of engagement with the rod thread 38, and establishing the lock configuration.

Figure 45:
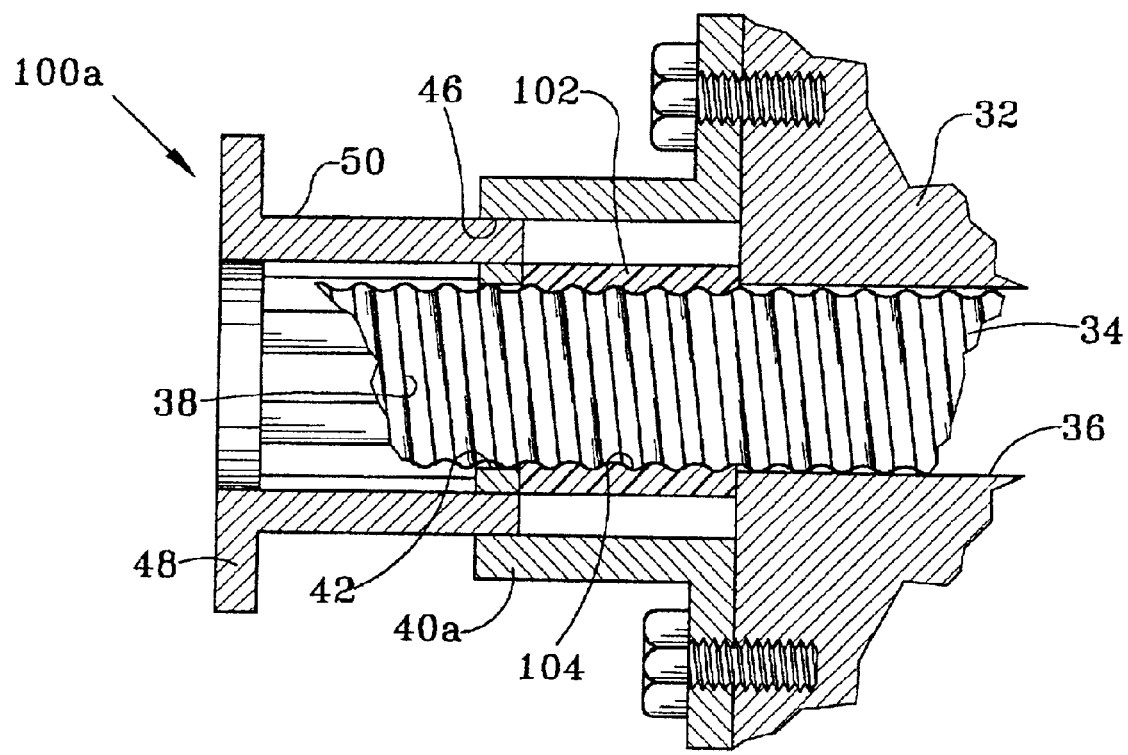

Again, force factors determining how much longitudinal force must be applied to the rod 34 in the restrain configuration of FIGS. 42 and 45 to expand the elastic sleeve 102 to remove its thread 104 from the rod thread 38 are the elasticity and geometry of the elastic sleeve. A longer sleeve 102 increases the force required to release the rod 34 for longitudinal movement, as does a greater elastic modulus of the elastic sleeve. Also, the profile of the rod thread 38 and the profile of the sleeve thread 104 can be varied to alter the amount of force needed to disengage these threads, as in the case of the coil springs and the rings discussed above.

Figure 48:
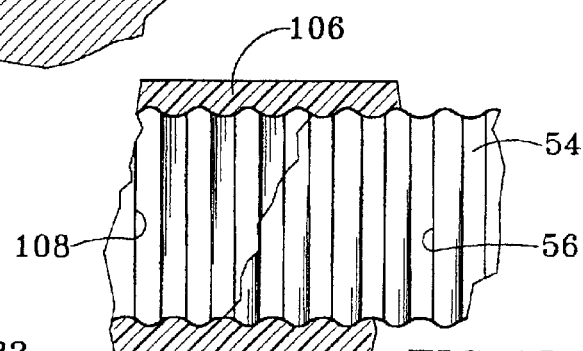
FIG. 48 is an enlarged, fragmentary cross section of the elastic sleeve of FIG. 47 with a rod having grooves.

An elastic sleeve may also be substituted for the split rings in rod brakes as illustrated in FIGS. 12–15, wherein the elastic sleeve would circumscribe the rod 54 and engage with the grooves 56. Such an elastic sleeve 106 is illustrated in FIG. 47, wherein the sleeve is shown to have a smooth external surface and an interior surface that is structure with circular grooves 108. FIG. 48 shows how the grooves 108 of the elastic sleeve 106 engage with the complimentary grooves 56 of the rod 54. Again, the force factor determining how much force must be applied to release the rod from the restrain configuration is dependent on the elasticity of the sleeve 106 and its geometry, including the size of the sleeve and the profile of its thread.

Figure 49:
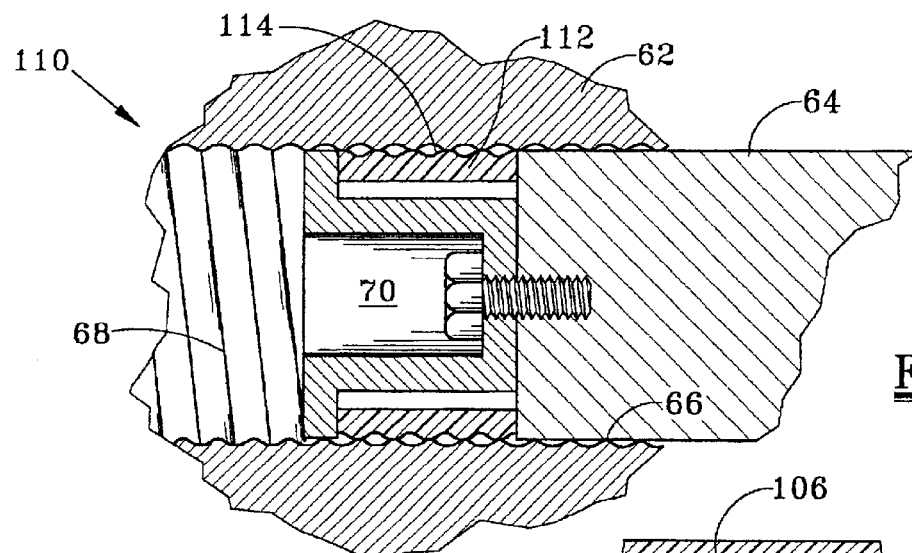
FIG. 49 is a side elevation similar to FIG. 20, but showing a rod brake employing an elastic sleeve with an external threaded surface.
Figure 50:
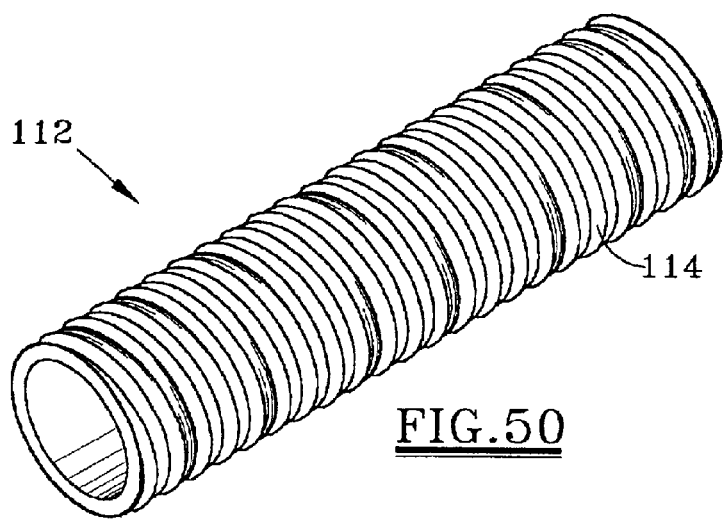
FIG. 50 is an isometric view of an elastic sleeve, having external grooves, that can be used with the rod brake of FIG. 49.

Yet another version of a rod brake according to the present invention is shown generally at 110 in FIG. 49. The rod brake 110 differs from the rod brake 60 of FIGS. 20 and 21 in that the rod brake 110 features an elastic sleeve 112 that has an outer surface that is structured with a thread 114 to provide the elastic factor, as further illustrated in FIGS. 50 and 51. The elastic sleeve 112 is confined by the retainer sleeve 70 that is bolted to the rod 64 within the passage 66 through the first body 62. The elastic sleeve thread 114 engages the thread 68 of the first body passage 66, as further shown in FIG. 51, to hold the rod relative to the first body in the restrain configuration, but sufficient longitudinal force applied to the rod forces the elastic sleeve to radially contract and disengage from the threads 68 to the release configuration illustrated in FIG. 49. The locking sleeve 76 may be added with the wider cap 70a as shown in FIGS. 22 and 23 to achieve a lock configuration as in FIG. 23, with the locking sleeve positioned within the elastic sleeve 112 to prevent disengagement of the elastic sleeve threads 114 from the first body threads 68.

Figure 52:
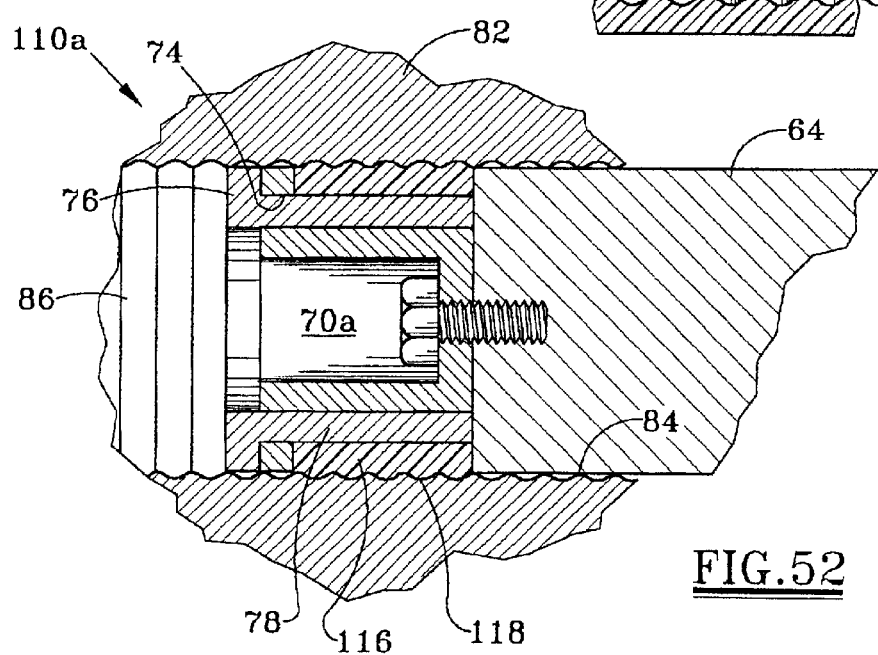
FIG. 52 is a view similar to FIG. 31, but showing a rod brake employing an elastic sleeve with an external surface having grooves.

FIG. 52 illustrates a variation of the rod brake 110a employing an elastic sleeve 116 with an outer surface that is structured with grooves 118 to engage the grooves 86 within the passage 84 through the first body 82 as shown in FIGS. 28–31. See also FIG. 53. The cap 70 may be used to confine the elastic sleeve 116 in the release and restrain configurations, as in the case of the rod brake 110 shown in FIG. 49. The locking sleeve 76 is shown added to the wider cap 70a in FIG. 52 to prevent expansion of the elastic sleeve 116 and removal of its grooves 118 out of engagement with the first body grooves 86, establishing the lock configuration.

Figure 51:
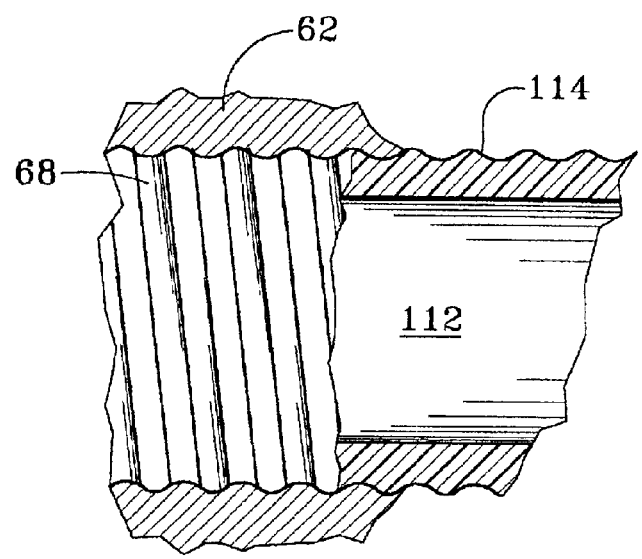
FIG. 51 is an enlarged, fragmentary cross section of the elastic sleeve of FIG. 50 with a first body having a threaded cylindrical surface.
Figure 53:
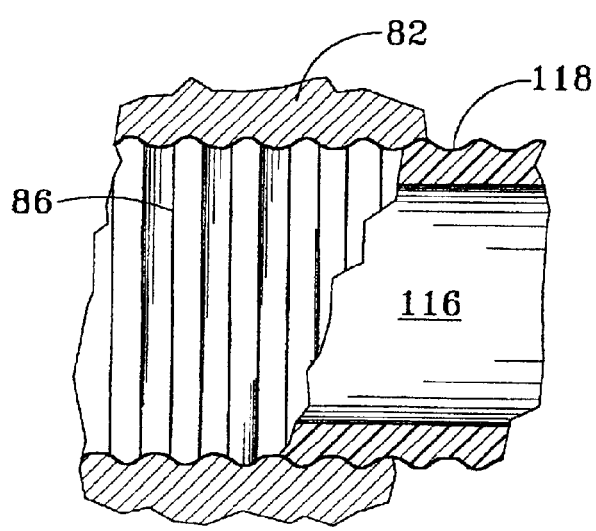
FIG. 53 is an enlarged, fragmentary cross section showing an elastic sleeve with an external grooved surface with a first body having a cylindrical surface with grooves.

Again, force factors determining how much longitudinal force must be applied to the rod 64 in the restrain configuration of FIGS. 51 and 53 to contract the elastic sleeve 112, or 116, to remove the sleeve thread 114 from the first body thread 68, or the sleeve grooves 118 from the first body grooves 86, are the elasticity and geometry of the respective elastic sleeve 112 or 116. A longer elastic sleeve increases the force required to release the rod 64 for longitudinal movement, as does a greater elastic modulus of the elastic sleeve. Also, the profile of the elastic sleeve thread 114 and the profile of the first body thread 68 can be varied to alter the amount of force needed to disengage these threads, as can the profiles of the elastic sleeve grooves 118 and the first body grooves 86.

Figure 54:
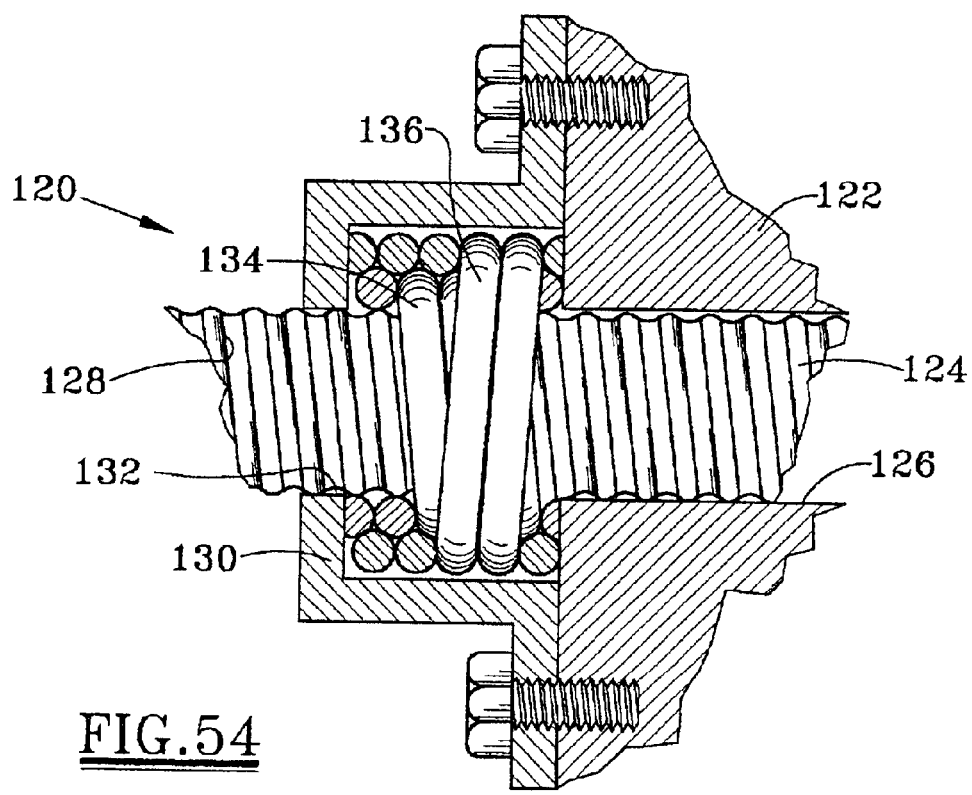
FIGS. 54 and 55 are side elevations in partial section of a rod brake in two different configurations, employing a second coil spring counter-wound over a first coil spring.
Figure 55:
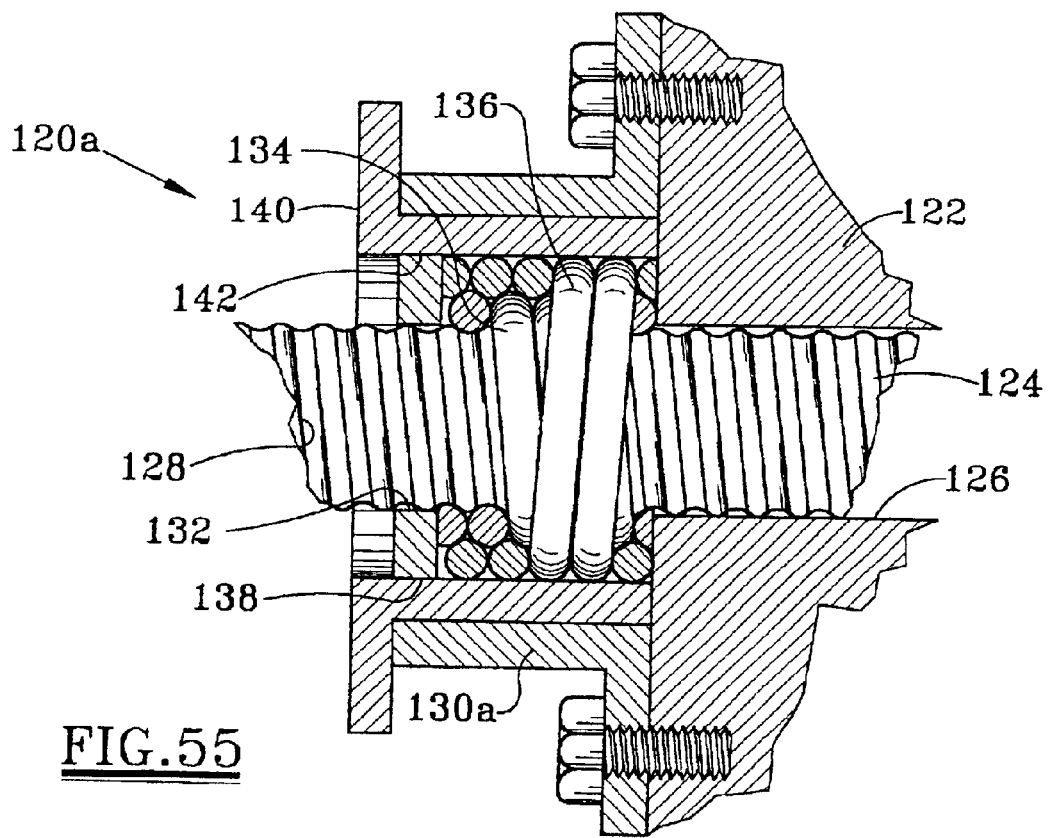

The performance of a rod brake according to the present invention can be varied by adding a second round elastic device around, or within, the first, or primary, elastic device. Such a rod brake is shown generally at 120 in FIG. 54, wherein a first body 122 circumscribes a rod 124 within a passage 126 through the first body. The surface of the rod 124 is structured with a thread 128. A retainer cap 130 is bolted to the end of the first body 122, and the rod 124 passes through an opening 132 in the cap 130. A primary coil spring 134 is confined within the retainer cap 130, and is received within the rod thread 128 in a lock configuration (not shown), as in the case of the rod brake 30 illustrated in FIG. 2. A second coil spring 136 is counter-wound around the primary coil spring 134. Longitudinal force applied to move the rod 124 longitudinally relative to the first body 122 must be sufficient to expand both the primary spring 134 and the secondary spring 136 to move the primary spring out of engagement with the rod thread 128 to the release configuration illustrated in FIG. 54. A modified version 120a of the rod brake 120 is shown in FIG. 55. An extended retainer cap 130a having slots 138 is employed as part of the rod brake 120a shown in FIG. 55 in the lock configuration. A locking sleeve 140 has legs 142 that are received through the cap slots 138 and overlie the secondary spring 136 to achieve the lock configuration illustrated in FIG. 55. As discussed above, the profile of the rod thread 128 as well as the profile of the primary coil spring 134 may be varied to further adjust the threshold of longitudinal force magnitude required to move the rod break from the restrain configuration (not shown) to the release configuration of FIG. 54.

Figure 56:
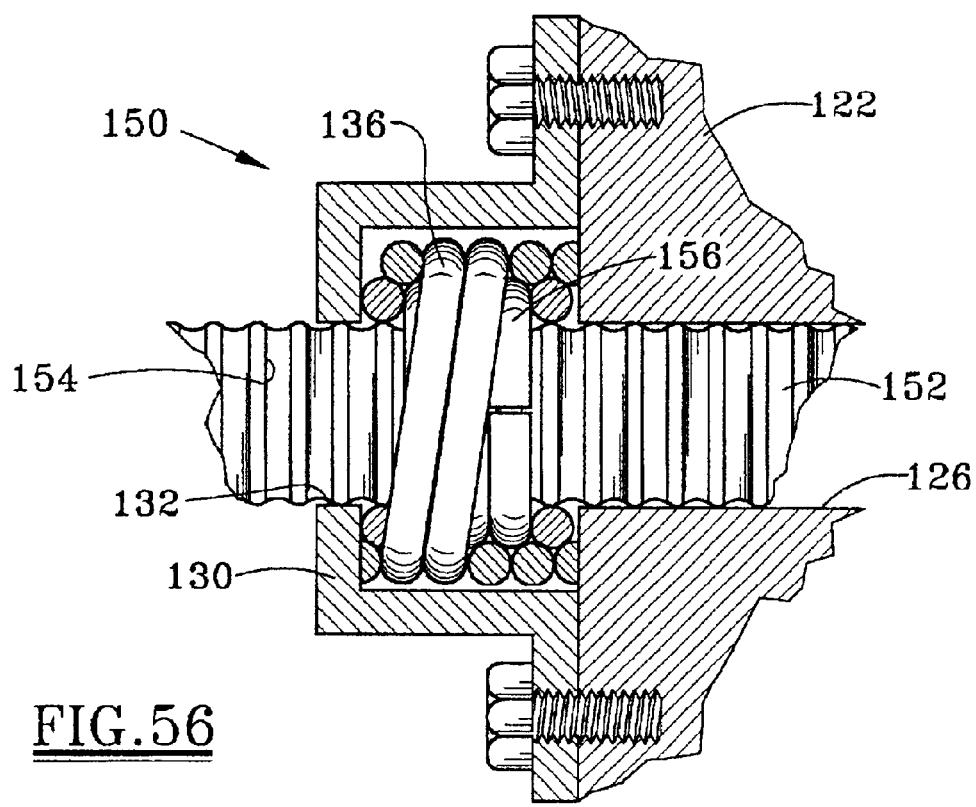
FIGS. 56 and 57 are side elevations in partial section of a rod brake in two different configurations, employing a coil spring wound over split rings.
Figure 57:
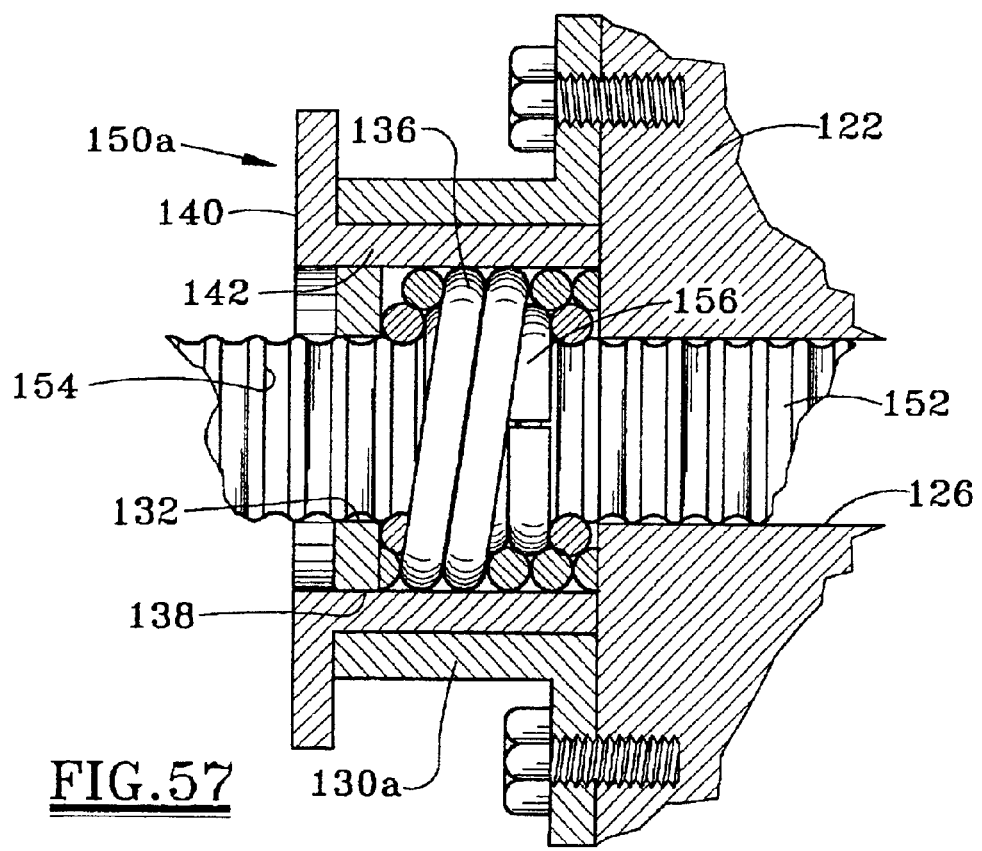

A secondary round elastic device may also be employed in conjunction with snap rings as the primary elastic device. Such a rod brake is shown generally at 150 in FIG. 56 wherein the first body 122 circumscribes a rod 152 within the passage 126 through the first body. The surface of the rod 152 is structured with grooves 154. The retainer cap 130 is bolted to the end of the first body 122, and the rod 152 passes through the opening 132 in the cap 130. A set of primary snap rings 156 is confined within the retainer cap 130, and is received within the rod grooves 154 in a lock configuration (not shown), as in the case of the rod brake 52 illustrated in FIG. 12. The secondary coil spring 136 is wound around the primary rings 156. Longitudinal force applied to move the rod 152 longitudinally relative to the first body 122 must be sufficient to expand both the primary rings 156 and the secondary spring 136 to move the rings out of engagement with the rod grooves 154 to the release configuration illustrated in FIG. 56. A modified version 150a of the rod brake 150 is shown in FIG. 57. The extended retainer cap 130a having slots 138 is employed as part of the rod brake 120a shown in FIG. 55 in the lock configuration. The legs 142 of the locking sleeve 140 are received through the cap slots 138 and overlie the spring 136 and maintain the rod break in the lock configuration as illustrated in FIG. 57. As discussed above, the profile of the rod grooves 154 as well as the profile of the primary snap rings 156 may be varied to further adjust the threshold of longitudinal force magnitude required to move the rod break from the restrain configuration (not shown) to the release configuration of FIG. 56.

Figure 58:
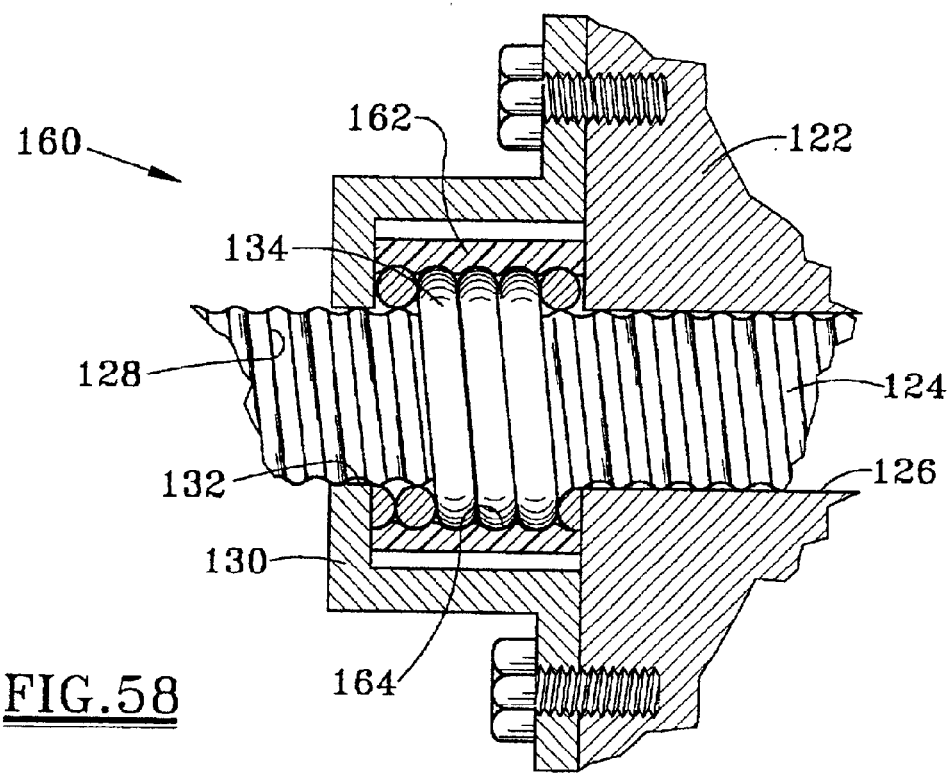
FIGS. 58 and 59 are side elevations in partial section of a rod brake in two different configurations, employing an elastic sleeve over a coil spring.
Figure 59:
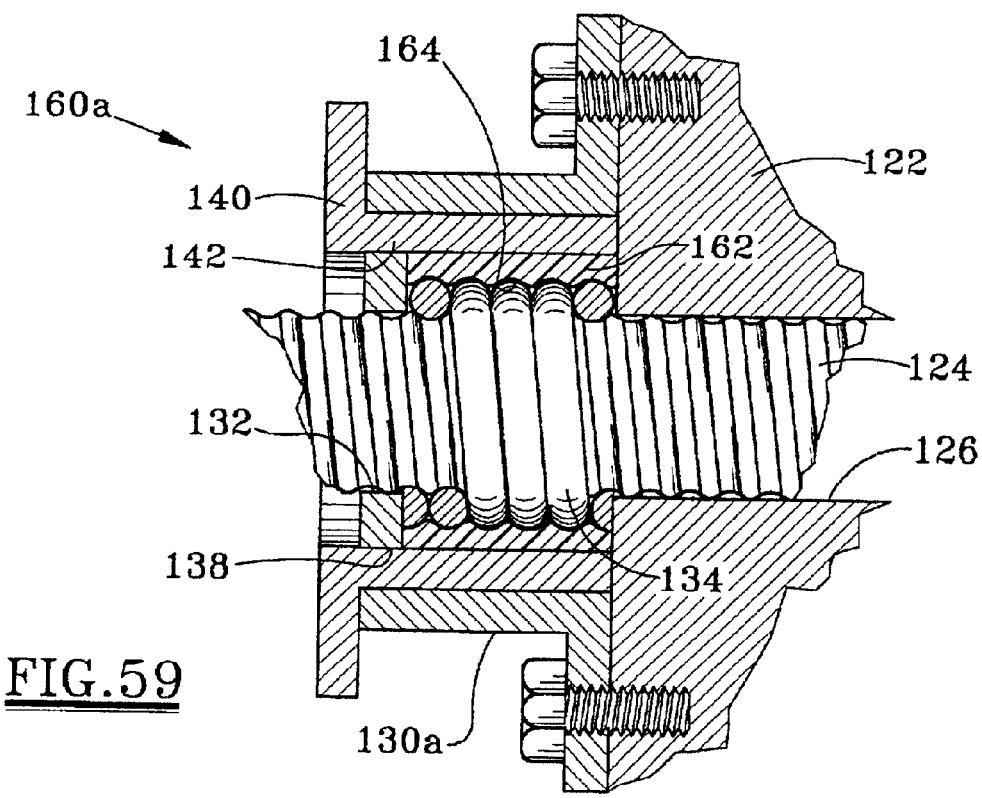

A secondary round elastic device in the form of an elastic sleeve may also be employed in conjunction with a primary elastic device. Such a rod brake is shown generally at 160 in FIG. 58, and is a modification of the rod brake 120 of FIG. 54. In FIG. 58 the first body 122 circumscribes the rod 124 within the passage 126 through the first body. The surface of the rod 124 is structured with the thread 128. The retainer cap 130 is bolted to the end of the first body 122, and the rod 124 passes through the opening 132 in the cap 130. The primary coil spring 134 is confined within the retainer cap 130, and is received within the rod thread 128 in a restrain configuration (not shown). A secondary elastic sleeve 162 is positioned around the primary coil spring 134. The elastic sleeve 162 may be structured with an interior thread 164, as illustrated in FIG. 44, for example, that engages with the coil spring 134. Longitudinal force applied to move the rod 124 longitudinally relative to the first body 122 must be sufficient to expand both the primary coil 134 and the secondary elastic sleeve 162 to move the spring out of engagement with the rod thread 128 to the release configuration illustrated in FIG. 58. A modified version 160a of the rod brake 160 is shown in FIG. 59. The extended retainer cap 130a having slots 138 is employed as part of the rod brake 160a shown in FIG. 59 in the lock configuration. The legs 142 of the locking sleeve 140 are received through the cap slots 138 and overlie the elastic sleeve 162 and maintain the rod break in the lock configuration illustrate in FIG. 59. As discussed above, the profile of the rod thread 128 as well as the profile of the primary coil 134 may be varied to further adjust the threshold of longitudinal force magnitude required to move the rod break from the restrain configuration (not shown) to the release configuration of FIG. 58.

Figure 60:
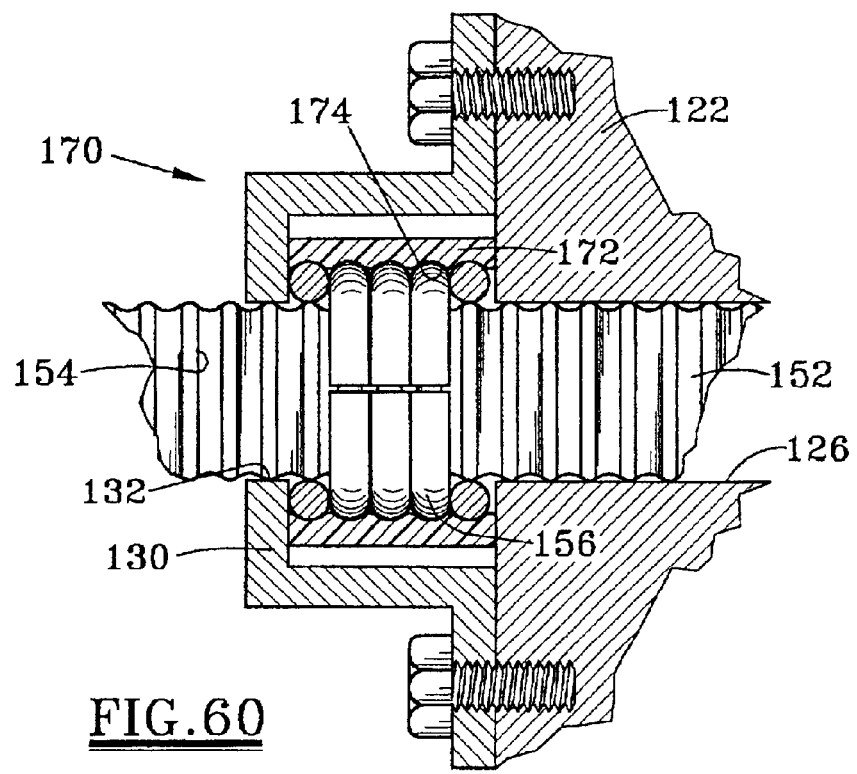
FIGS. 60 and 61 are side elevations in partial section of a rod brake in two different configurations, employing an elastic sleeve over split rings.
Figure 61:
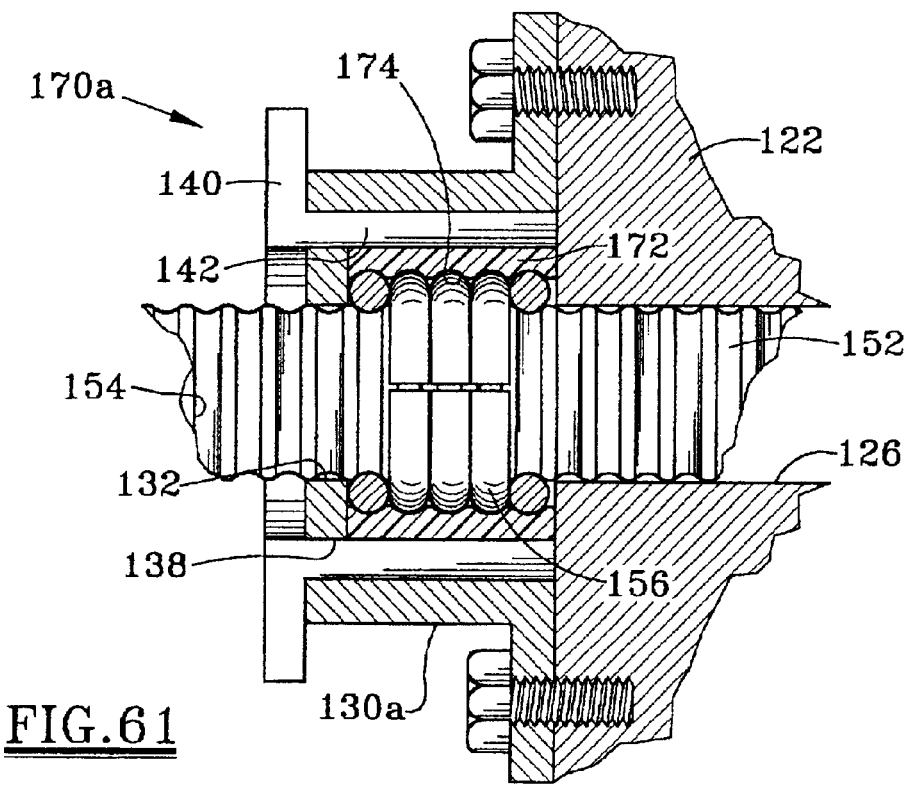

A secondary round elastic device in the form of an elastic sleeve may also be employed in conjunction with snap rings as the primary elastic device. Such a rod brake is shown generally at 170 in FIG. 60 wherein the first body 122 circumscribes the rod 152 within the passage 126 through the first body. The surface of the rod 152 is structured with grooves 154. The retainer cap 130 is bolted to the end of the first body 122, and the rod 152 passes through the opening 132 in the cap 130. A set of primary snap rings 156 is confined within the retainer cap 130, and is received within the rod grooves 154 in the restrain configuration (not shown), as in the case of the rod brake 150 illustrated in FIG. 56. A secondary elastic sleeve 172 is positioned around the primary snap rings 156. The elastic sleeve 172 may be structured with interior grooves 174, as illustrated in FIG. 48, for example, that engage with the snap rings 156. Longitudinal force applied to move the rod 124 longitudinally relative to the first body 122 must be sufficient to expand both the primary snap rings 156 and the secondary elastic sleeve 172 to move the rings out of engagement with the rod grooves 154 to the release configuration illustrated in FIG. 60. A modified version 170a of the rod brake 170 is shown in FIG. 61. The extended retainer cap 130a having slots 138 is employed as part of the rod brake 170a shown in FIG. 61 in the lock configuration. The legs 142 of the locking sleeve 140 are received through the cap slots 138 and overlie the elastic sleeve 172 and maintain the rod break in the lock configuration. As discussed above, the profile of the rod grooves 154 as well as the profile of the primary rings 156 may be varied to further adjust the threshold of longitudinal force magnitude required to move the rod break from the restrain configuration (not shown) to the release configuration of FIG. 60.

Figure 62:
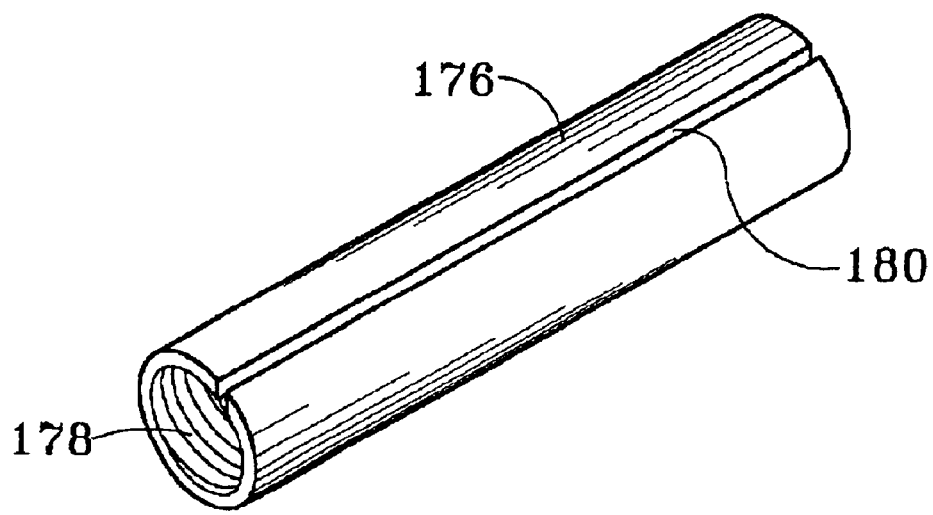
FIG. 62 is an isometric view of an elastic sleeve that can be used with the rod brake of FIGS. 58 and 59, having a longitudinal split.
Figure 63:
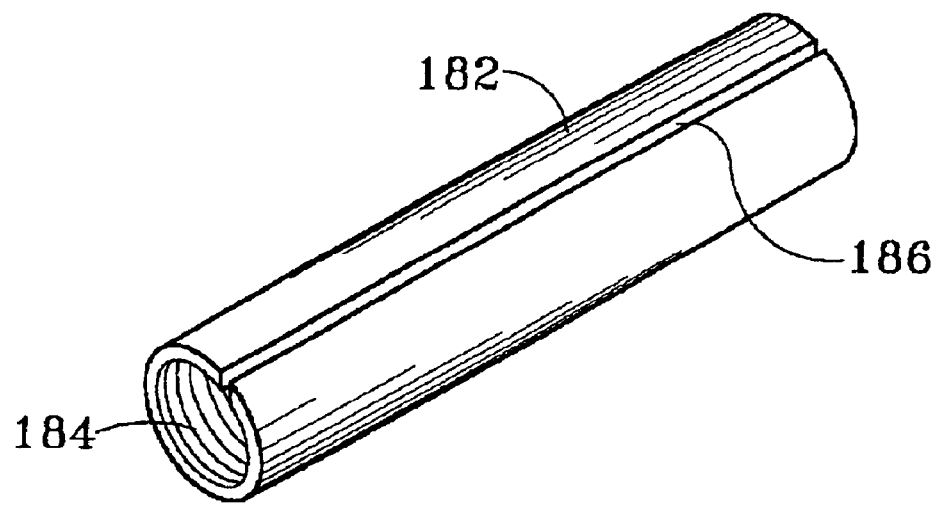
FIG. 63 is a view similar to FIG. 62, showing an elastic sleeve, with a longitudinal split, for use with the rod brake of FIGS. 60 and 61.

Elastic sleeves utilized as secondary elastic devices in rod brakes illustrated in FIGS. 58–61, for example, may feature longitudinal splits to enhance operation of the rod brake. FIG. 62 shows such an elastic sleeve 176 with interior threads 178 and a split 180 extending the entire length of the sleeve. FIG. 63 shows an elastic sleeve 182 with interior grooves 184 and a split 186 extending the entire length of the sleeve. The splits 180 and 186 facilitate expansion of the respective sleeves in moving the rod brake from a restrain configuration to a release configuration, for example.

Figure 64:
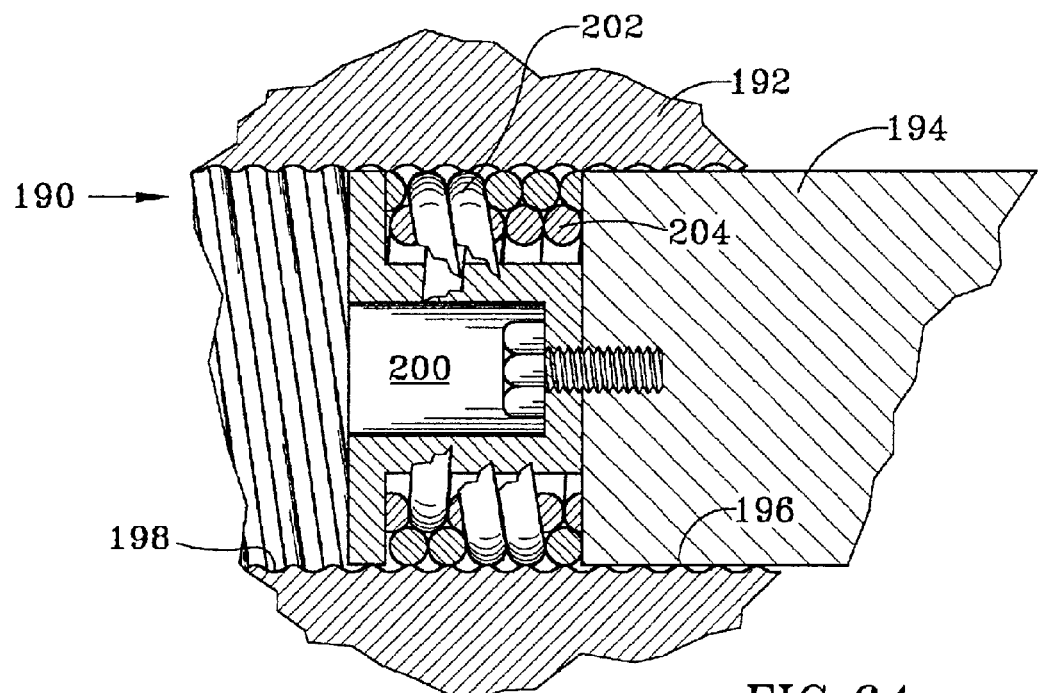
FIG. 64 and is side elevation in partial section of a rod brake employing a second coil spring counter-wound under a first coil spring.
Figure 65:
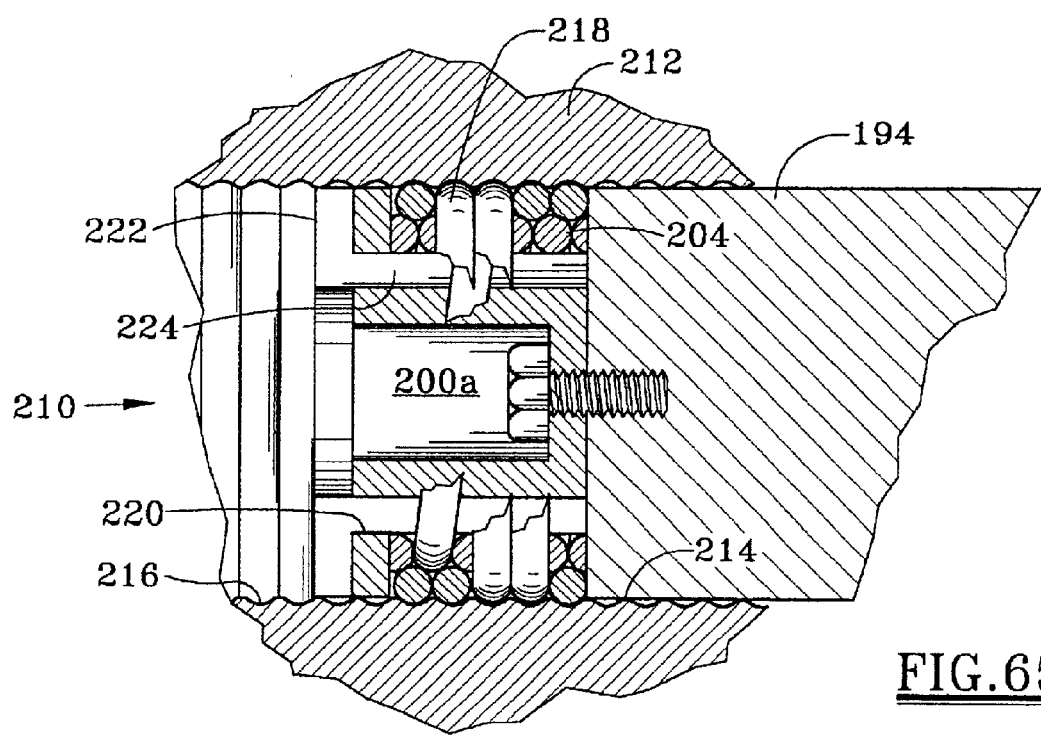
FIG. 65 and is side elevation in partial section of a rod brake employing a coil spring under split rings

A secondary round elastic device may also be employed with a rod brake that features contraction to release the rod for longitudinal movement. FIG. 64 illustrates a rod brake, shown generally at 190, wherein a first body 192 circumscribes a rod 194 within a passage 196. The interior surface of the passage 196 is structured with a thread 198. A retainer sleeve 200 is bolted to the end of the rod 194. A primary coil spring 202 circumscribes the retainer sleeve 200 and is constrained by the sleeve and the rod 194 to move longitudinally with the rod relative to the first body 192. The primary spring 202 is held tightly against the side of the passage 196 of the first body 192 by the geometry and elasticity of the spring so that the spring resides within the thread 198 in the spring's most relaxed, or least strained, configuration, that is, in the restrain configuration (not shown) of the rod brake 190. A secondary coil spring 204 is counter-wound under the primary spring 202, and is also confined by the retainer sleeve 200 and the end of the rod 194. Longitudinal force applied to move the rod 194, relative to the first body 192 must contract both the primary spring 202 and the secondary spring 204 sufficiently to drive the primary spring out of engagement with the first body thread 198 to move the rod brake 190 to the release configuration shown in FIG. 64. A modified version of the rod brake 190 utilizing an expanded retainer sleeve and a locking sleeve, as illustrated in FIG. 65 and described below, may also be employed to achieve a lock configuration (not shown). Again, the profile of the first body threads 198 as well as the profile of the primary coil spring 202 may be varied to adjust the threshold of force magnitude required to move the rod break from the restrain configuration (not shown) to the release configuration of FIG. 64.

FIG. 65 illustrates a rod brake, shown generally at 210 in the lock configuration, which is another variation of a rod brake that employs contraction to release the rod for longitudinal movement, and also includes a secondary round elastic device, similar to the rod brake 190 of FIG. 64. In the rod brake 210 of FIG. 65, a first body 212 circumscribes the rod 194 within a passage 214. The interior surface of the passage 214 is structured with grooves 216. An expanded retainer sleeve 200a is bolted to the end of the rod 194. A set of primary snap rings 218 circumscribes the retainer sleeve 200a and is constrained by the sleeve and the rod 194 to move longitudinally with the rod relative to the first body 212. The primary rings 218 is held tightly against the side of the passage 216 of the first body 212 by the geometry and elasticity of the rings so that the rings reside within respective grooves 216 in the rings' most relaxed, or least strained, configuration, that is, in the restrain configuration (not shown) of the rod brake 210. A secondary coil spring 204 is wound under the primary rings 218, and is also confined by the retainer sleeve 200a and the end of the rod 194. Longitudinal force applied to move the rod 194, relative to the first body 212 must contract the primary rings 218 and the secondary spring 204 sufficiently to drive the primary rings out of engagement with the first body grooves 216 to move the rod brake 210 to the release configuration (not shown). The extended retainer sleeve 200a has slots 220 that allow the retainer sleeve to accommodate a locking sleeve 222, receiving the legs 224 of the locking sleeve. In FIG. 65, the locking sleeve legs 224 are shown positioned between the secondary coil spring 204 and the retainer sleeve 200a, holding the primary snap rings 218 engaged within the first body grooves 216 to achieve the lock configuration, holding the rod 194 against longitudinal movement relative to the first body 212 by providing slots. A modified version of the rod brake 210 utilizes a non-extended retainer sleeve such as the retainer sleeve 200 as described above and illustrated in FIG. 64 to achieve both a release configuration (similar to that shown in FIG. 64) and a restrain configuration (not shown). Again, the profile of the first body grooves 216 as well as the profile of the primary snap rings 218 may be varied to adjust the threshold of force magnitude required to move the rod break from the restrain configuration (not shown) to the release configuration (not shown).

Figure 66:
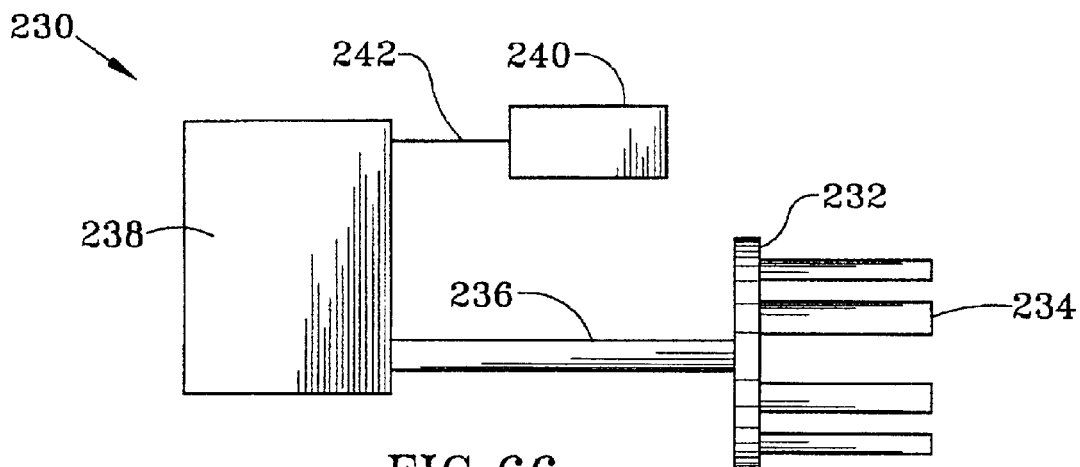
FIG. 66 is a schematic diagram of an operating system for controlling the position of a locking sleeve according to the present invention.

Operation of a locking sleeve to move a rod brake from a restrain configuration to a lock may be by any technique suitable for the particular application of the rod brake, including direct manipulation by hand where appropriate, for example. An appropriate operating system may also be employed to control the position of the locking sleeve. FIG. 66 provides a schematic illustration of such an operating system, shown generally at 230. A locking sleeve 232, has legs 234, and is part of an associated rod brake (not shown). An arm 236 connects the locking sleeve 232 to an actuator 238. A control unit 240 is connected to the actuator 238 by appropriate connection 242. The actuator 238 operates to selectively move the locking sleeve 232 back and forth relative to the retainer cap or retainer sleeve, as appropriate, of an associated rod brake to achieve a lock configuration or to withdraw from the lock configuration, under commands from the control unit. The actuator 238 may operate according to any appropriate technology, and may be commanded under any appropriate technology by the control unit 240. Also, the nature of the connection 242 will be dictated by the technology of the control unit 240.

Figure 67:
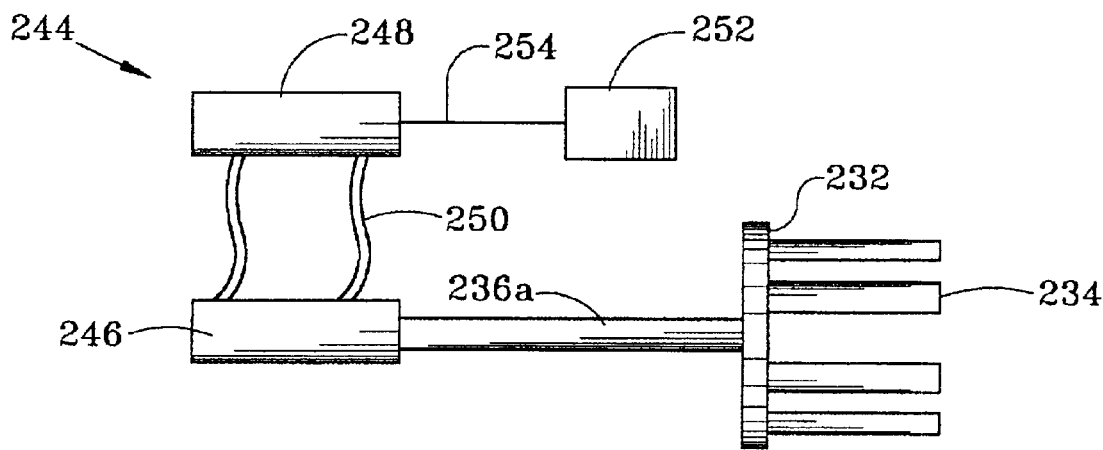
FIG. 67 is a view similar to FIG. 66, but indicating a fluid pressure actuator.

An example of one form of operating system is shown generally at 244 in the schematic diagram of FIG. 67. The operating system 244 comprises a fluid pressure operated actuator in the form of a piston and cylinder combination. A cylinder 246 contains the piston head from which a piston arm 236a extends to join the locking sleeve 232. A fluid pressure system 248 includes a compressor, a pump, and/or an accumulator as needed. The fluid pressure system is connected to the cylinder 246 by fluid pressure communications lines 250. A control unit 252 is connected to the fluid pressure system 248 by appropriate connection 254. The control unit 252 generates commands that are communicated to the fluid pressure system 248 by the connection 254. In response to the commands, the fluid pressure system 248 applies fluid pressure to one side or the other of the piston head in the cylinder 246, for example, to operate the piston 236a to drive the locking sleeve 232 to lock configuration, or to withdraw the locking sleeve to restrain configuration, of the associated rod brake. The control unit 252 may be of any appropriate technology, such as electrical or fluid pressure, and the nature of the connection 254 is determined accordingly.

Figure 68:
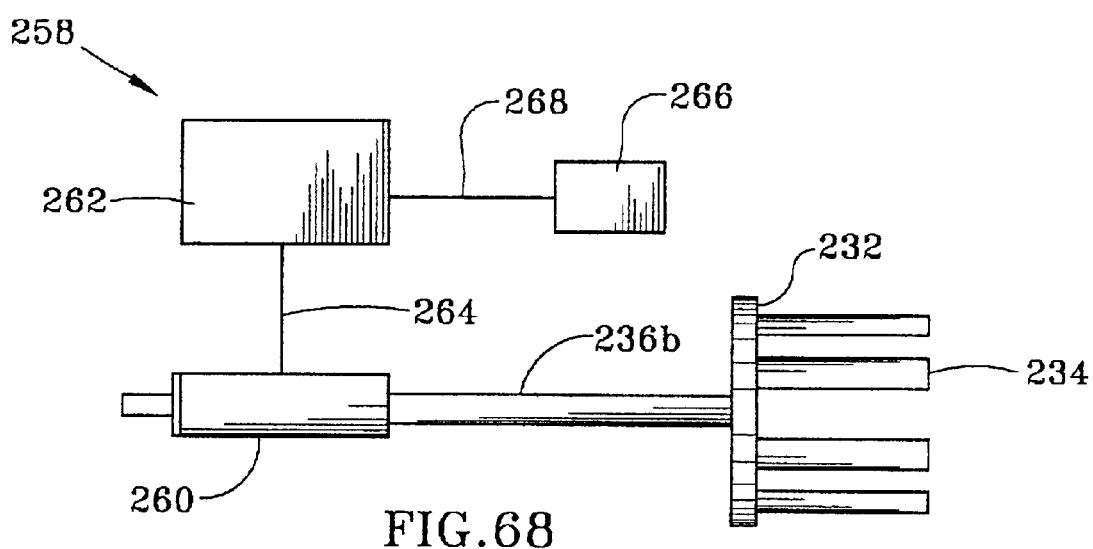
FIG. 68 is a view similar to FIG. 66, but indicating an electrical actuator.

Another example of a form of operating system is shown generally at 258 in the schematic diagram of FIG. 68. The operating system 258 comprises an electrically operated actuator in the form of a solenoid and armature combination.

A solenoid 260 contains an armature that extends as the arm 236b to join the locking sleeve 232. An electric current source 262 is connected to the solenoid 260 by appropriate electrical connection 264. A control unit 266 is connected to the electric current generator 262 by appropriate connection 268. The control unit 266 generates commands that are communicated to the electric generator 262 by the connection 268. In response to the commands, the electric generator 262 provides electric current to the solenoid 260, by appropriate connection 264, to move the armature 236b to the right or to the left as viewed in FIG. 68 to drive the locking sleeve 232 to lock configuration, or to withdraw the locking sleeve to restrain configuration, respectively, of the associated rod brake. The control unit 266 may be of any appropriate technology, and the nature of the connection 268 is determined accordingly.

From the foregoing it is seen that the present invention provides a rod brake that utilizes the elastic properties of round, or generally cylindrical devices in expanding or contracting. Three configurations are available, including a restrain configuration wherein the rod is held in place due to the engagement of the elastic device with either circular grooves or a single helical groove, that is, a thread. Longitudinal force of a magnitude at least as great as a threshold magnitude, determined by the geometry of the brake and the elasticity of the elastic device, pushes the elastic device out of engagement with the groove or grooves, causing the elastic device to expand or contract radially, depending on the embodiment of the invention. The brake is then in the release configuration, wherein the rod can be translated. The brake will remain in the release configuration as long as sufficient force is applied to force the elastic device out of engagement with the groove or grooves. With the brake in the restrain configuration, the brake can be moved into the lock configuration by use of a locking device, such as a locking sleeve that resides against the elastic device and prevents its removal from engagement with the groove or grooves. A locking pin is available to prevent contraction of a set of split rings. In all embodiments utilizing an elastic device and a groove having leads, rotational movement between the first and second bodies to align the elastic device with the thread will remove longitudinal slack between the first and second bodies in the restrain configuration.

An elastic sleeve as utilized in the present invention may be made of any appropriate material, such as rubber or titanium, for example. The size of the rod brake, the magnitude of force involved in its function and the environment in which the rod brake is to be used will determine the material of the elastic sleeve.

A rod brake according to the present invention may be constructed in a wide range of sizes and resistance strengths to meet industrial or other applications.

What is claimed is:

1. Apparatus for retarding translation of one body relative to another body, comprising:
   a. a first body circumscribing a second body;
   b. a cylindrical surface with one or more grooves is part of the second body;
   c. a retainer carried by the first body;
   d. a first round elastic device, constrained by its elasticity toward the one or more grooves of the cylindrical surface, and confined by the retainer and thereby restrained against longitudinal movement relative to the retainer;
   e. the first round elastic device being movable between a restrain configuration in which the first round elastic device resides in the one or more grooves of the cylindrical surface to prevent relative translation between the first and second bodies, and a release configuration in which the first round elastic device is distorted and forced out of the one or more grooves of the cylindrical surface to allow relative translation between the first and second bodies, by relative longitudinal movement between the first and second bodies;

f. the first round elastic device is distorted and removed from the one or more grooves by radial expansion of the first round elastic device; and, g. a locking sleeve receivable by the retainer with the first round elastic device in the restrain configuration to lock the first round elastic device against moving to the release configuration.

2. Apparatus for retarding translation of one body relative to another body, comprising:

a. a first body circumscribing a second body;

b. a cylindrical surface with one or more grooves as part of one of the first and second bodies;

c. a retainer carried by the other of the first and second bodies;

d. a first round elastic device, constrained by its elasticity toward the one or more grooves of the cylindrical surface, and confined by the retainer and thereby restrained against longitudinal movement relative to the retainer;

e. the first round elastic device being movable between a restrain configuration in which the first round elastic device resides in the one or more grooves of the cylindrical surface to prevent relative translation between the first and second bodies, and a release configuration in which the first round elastic device is distorted and forced out of the one or more grooves of the cylindrical surface to allow relative translation between the first and second bodies, by relative longitudinal movement between the first and second bodies; and, f. a locking sleeve receivable by the retainer with the first round elastic device in the restrain configuration to lock the first round elastic device against moving to the release configuration.

3. A method for retarding translation of one body relative to another body, comprising the following steps:

a. providing a first body circumscribing a second body;

b. providing a cylindrical surface as part of one of the first and second bodies, with the cylindrical surface structured with one or more grooves;

c. providing a retainer carried by the other of the first and second bodies;

d. providing a first round elastic device, constrained by its elasticity toward the one or more grooves of the cylindrical surface, and confined by the retainer and thereby restrained against longitudinal movement relative to the retainer;

e. preventing relative translation between the first and second bodies by the first round elastic device residing in the one or more grooves of the cylindrical surface in a restrain configuration, and applying longitudinal force to distort the first round elastic device and push it out of the one or more grooves of the cylindrical surface to a release configuration to allow relative translation between the first and second bodies;

f. providing a locking member; and g. inserting the locking member into the retainer with the first round elastic device in the restrain configuration and locking the first round elastic device from moving to the release configuration.

4. A method as defined in claim 3 further comprising:

a. providing the cylindrical surface as part of the second body;

b. providing the retainer carried by the first body; and c. so distorting the first round elastic device to remove the first round elastic device from the one or more grooves by radially expanding the first round elastic device.

5. A method as defined in claim 3 further comprising:

a. providing the first elastic device structured with a lead;

b. providing one or more grooves in the cylindrical surface comprising a thread that receives the first elastic device; and c. causing rotational movement between the first and second bodies to align the first elastic device with the thread to remove longitudinal slack between the first and second bodies in the restrain configuration.

* * * * *